US011889400B2

(12) United States Patent
Xu et al.

(10) Patent No.: US 11,889,400 B2
(45) Date of Patent: *Jan. 30, 2024

(54) METHOD AND APPARATUS FOR SELECTING RELAY IN DEVICE-TO-DEVICE COMMUNICATION

(71) Applicant: Huawei Technologies Co., Ltd., Shenzhen (CN)

(72) Inventors: Kai Xu, Shenzhen (CN); Chao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,347

(22) Filed: Nov. 1, 2021

(65) Prior Publication Data
US 2022/0060967 A1 Feb. 24, 2022

Related U.S. Application Data

(63) Continuation of application No. 15/568,350, filed as application No. PCT/CN2015/079021 on May 15, 2015, now Pat. No. 11,197,227.

(51) Int. Cl.
*H04W 40/22* (2009.01)
*H04W 88/04* (2009.01)
(Continued)

(52) U.S. Cl.
CPC .......... *H04W 40/22* (2013.01); *H04B 7/2606* (2013.01); *H04W 40/12* (2013.01); *H04W 88/04* (2013.01)

(58) Field of Classification Search
CPC ..... H04W 40/22; H04W 40/12; H04B 7/2606
See application file for complete search history.

(56) References Cited

U.S. PATENT DOCUMENTS 8,938,197 B2   1/2015   Zhou et al.
10,674,425 B2  6/2020   Gulati et al.
(Continued)

FOREIGN PATENT DOCUMENTS

CN   102780993 A   11/2012
CN   103731900 A   4/2014
(Continued)

OTHER PUBLICATIONS

"Revised WI: Enhanced LTE Device to Device Proximity Services," 3GPP TSG RAN Meeting #67, Shanghai, China, RP-150441, 3rd Generation Partnership Project, Valbonne, France (Mar. 9-12, 2014).
(Continued)

*Primary Examiner* — Redentor Pasia
(74) *Attorney, Agent, or Firm* — Leydig, Voit & Mayer, Ltd.

(57) ABSTRACT

The present invention discloses a method and an apparatus for selecting a relay in D2D communication. The method includes: determining, by a relay selection device, link quality of a first link of each candidate relay UE in a candidate relay UE list, where the candidate relay UE list includes at least one candidate relay UE, and the first link of each candidate relay UE is a radio link between each candidate relay UE and a base station; and determining target relay UE from the candidate relay UE list according to the link quality of the first link of each candidate relay UE in the candidate relay UE list, where the target relay UE is used for relaying data transmitted between first UE and the base station.

16 Claims, 10 Drawing Sheets

(51) Int. Cl.
*H04B 7/26* (2006.01)
*H04W 40/02* (2009.01)
*H04W 40/12* (2009.01)

(56) References Cited

U.S. PATENT DOCUMENTS

| | | | |
|---|---|---|---|
| 2009/0227258 A1 | 9/2009 | Youn et al. | |
| 2010/0167743 A1 | 7/2010 | Palanki et al. | |
| 2014/0141777 A1* | 5/2014 | Guo | H04W 8/005 455/434 |
| 2014/0171062 A1* | 6/2014 | Fallgren | H04W 40/22 455/422.1 |
| 2014/0328329 A1 | 11/2014 | Novlan et al. | |
| 2015/0029866 A1* | 1/2015 | Liao | H04W 48/14 370/254 |
| 2015/0031406 A1 | 1/2015 | Fouad et al. | |
| 2015/0133132 A1* | 5/2015 | Li | H04W 52/246 455/450 |
| 2015/0296465 A1 | 10/2015 | Larsson et al. | |
| 2016/0029331 A1 | 1/2016 | Seo et al. | |
| 2016/0095074 A1 | 3/2016 | Park et al. | |
| 2016/0135203 A1 | 5/2016 | Kim et al. | |
| 2016/0150390 A1 | 5/2016 | Chen et al. | |
| 2016/0174130 A1 | 6/2016 | Ljung et al. | |
| 2016/0286374 A1 | 9/2016 | Baghel et al. | |
| 2016/0323892 A1* | 11/2016 | Pradini | H04W 72/048 |
| 2016/0345371 A1* | 11/2016 | Gattami | H04W 24/10 |
| 2017/0164332 A1* | 6/2017 | Kim | H04W 72/02 |
| 2017/0180974 A1 | 6/2017 | Bienas et al. | |
| 2017/0251507 A1* | 8/2017 | Fodor | H04W 40/22 |
| 2018/0092017 A1* | 3/2018 | Freda | H04W 36/36 |
| 2020/0178330 A1 | 6/2020 | Wu et al. | |

FOREIGN PATENT DOCUMENTS

| | | |
|---|---|---|
| CN | 104105155 A | 10/2014 |
| CN | 105594295 A | 5/2016 |
| EP | 2983426 A1 | 2/2016 |
| WO | 2014161383 A1 | 10/2014 |
| WO | 2014179294 A2 | 11/2014 |
| WO | 2014205838 A1 | 12/2014 |
| WO | 2015002456 A1 | 1/2015 |

OTHER PUBLICATIONS

"Support of UE-Network relays," 3GPP TSG-RAN WG1 #80BIS, Belgrade, Serbia, R1-151400, 3rd Generation Partnership Project, Valbonne, France (Apr. 20-24, 2015).

"D2D system design enhancement to support out-of-coverage and partial coverage discovery for UE-network relays," 3GPP TSG RAN WG1 Meeting #80bis, Belgrade, Serbia, R1-151328, 3rd Generation Partnership Project, Valbonne, France (Apr. 20-24, 2015).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.5.0, pp. 1-445, 3rd Generation Partnership Project, Valbonne, France (Mar. 2015).

"3rd Generation Partnership Project; Technical Specification Group Radio Access Network; Evolved Universal Terrestrial Radio Access (E-UTRA); Requirements for support of radio resource management (Release 12)," 3GPP TS 36.133, V12.7.0, pp. 1-1014, 3rd Generation Partnership Project, Valbonne, France (Mar. 2015).

"3rd Generation Partnership Project; Technical Specification Group Radio Access Network; Evolved Universal Terrestrial Radio Access (E-UTRA); Physical layer; Measurements (Release 12)," 3GPP TS 36.214, V12.2.0, pp. 1-17, 3rd Generation Partnership Project, Valbonne, France (Mar. 2015).

"3rd Generation Partnership Project; Technical Specification Group Services and System Aspects; Proximity-based services (ProSe); Stage 2 (Release 12)," 3GPP TS 23.303, V12.4.0, pp. 1-63, 3rd Generation Partnership Project, Valbonne, France (Mar. 2015).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300, V12.5.0, pp. 1-251, 3rd Generation Partnership Project, Valbonne, France (Mar. 2015).

"WF on UE-relay," 3GPP TSG RAN WG1 Meeting #80bis Belgrade, Serbia, XP050935113 R1-152310, 3rd Generation Partnership Project, Valbonne, France (Apr. 20-24, 2015).

Huawei et al, "Relay UE selection for UE-to-Network relay," 3GPP TSG RAN WG1 Meeting #80bis, Belgrade, Serbia, R1-151278, total 3 pages, 3rd Generation Partnership Project, Valbonne, France (Apr. 20-24, 2015).

Vice-Chair (InterDigital), "Report of the LTE break-out session (ProSe)," 3GPP TSG RAN WG2 #89bis, Bratislava, Slovakia, R2-151722, total 17 pages, 3rd Generation Partnership Project, Valbonne, France (Apr. 20-24, 2015).

U.S. Appl. No. 15/568,350, filed Oct. 20, 2017.

"3rd Generation Partnership Project; Technical Specification Group Services and System Aspects; Feasibility study on LTE relay node security Release 10," 3GPP TR 33.816 V10.0.0, pp. 1-94, 3rd Generation Partnership Project, Valbonne, France (Mar. 2011).

* cited by examiner

METHOD AND APPARATUS FOR SELECTING RELAY IN DEVICE-TO-DEVICE COMMUNICATION

CROSS-REFERENCE TO RELATED APPLICATIONS

This application is a continuation of U.S. patent application Ser. No. 15/568,350, filed on Oct. 20, 2017, which is a National Stage of International Application No. PCT/CN2015/079021, filed on May 15, 2015. Both of the aforementioned applications are hereby incorporated by reference in their entireties.

TECHNICAL FIELD

Embodiments of the present invention relate to the communications field, and more specifically, to a method and an apparatus for selecting a relay in device-to-device communication.

BACKGROUND

A relay technology is a technology in which an intermediate device is used for forwarding data transmitted between two devices. For example, as shown in FIG. 1, a device C needs to forward data transmitted between a device A and a device B. In this case, when the device A needs to send data to the device B, the data sent by the device A first arrives at the device C, and then, the device C forwards the received data of the device A to the device B, so that the data is transmitted from the device A to the device B.

In the Release 10 (Rel-10) of the 3rd Generation Partnership Project (3GPP), a relay node (RN) is an independent network element. There is a backhaul transmission link between the RN and a base station, and there is a cellular link between the RN and user equipment. For the user equipment, the RN may be a small cell. The RN is synchronized with the base station by accessing the base station. In addition, the RN sends downlink data to the user equipment like a common base station, and the user equipment sends uplink data to the RN according to received downlink scheduling signaling sent by the RN. However, with further development of technologies, researchers propose a technical solution of using user equipment as a relay node. In this case, when there are multiple other user equipments around user equipment, how to select a relay node and how to trigger relay node reselection are technical problems that have not been resolved in the prior art.

SUMMARY

Embodiments of the present invention provide a method and an apparatus for selecting a relay in D2D communication, so that suitable relay UE can be selected for first UE.

According to a first aspect, an embodiment of the present invention provides a method and an apparatus for selecting a relay in D2D communication, including: determining, by a relay selection device, link quality of a first link of each candidate relay UE in a candidate relay UE list, where the candidate relay UE list includes at least one candidate relay UE, and the first link of each candidate relay UE is a radio link between each candidate relay UE and a base station; and determining target relay UE from the candidate relay UE list according to the link quality of the first link of each candidate relay UE in the candidate relay UE list, where the target relay UE is used for relaying data between first UE and the base station.

In a first possible implementation of the first aspect, before the determining target relay UE from the candidate relay UE list, the method further includes: determining link quality of a second link of each candidate relay UE in the candidate relay UE list, where the second link of each candidate relay UE is a radio link between each candidate relay UE and the first UE; and the determining target relay UE from the candidate relay UE list according to the link quality of the first link of each candidate relay UE in the candidate relay UE list includes: determining the target relay UE from the candidate relay UE list according to the link quality of the first link and the link quality of the second link of each candidate relay UE in the candidate relay UE list.

With reference to the foregoing possible implementations, in a second possible implementation of the first aspect, the determining the target relay UE from the candidate relay UE list according to the link quality of the first link and the link quality of the second link of each candidate relay UE in the candidate relay UE list includes: determining first candidate relay UE in the candidate relay UE list as the target relay UE, where link quality of a first link of the first candidate relay UE is greater than a first threshold, and link quality of a second link of the first candidate relay UE is greater than a second threshold.

With reference to the foregoing possible implementations, in a third possible implementation of the first aspect, the first candidate relay UE further meets at least one of the following conditions: an absolute value of a difference between the link quality of the first link of the first candidate relay UE and the link quality of the second link of the first candidate relay UE is less than a third threshold; or the first candidate relay UE is candidate relay UE with a largest link quality sum in the candidate relay UE list, where a link quality sum of each candidate relay UE is equal to a sum of the link quality of the first link of each candidate relay UE and the link quality of the second link of each candidate relay UE; or the first candidate relay UE is candidate relay UE with a smallest link quality difference in the candidate relay UE list, where a link quality difference of each candidate relay UE is equal to an absolute value of a difference between the link quality of the first link of each candidate relay UE and the link quality of the second link of each candidate relay UE.

With reference to the foregoing possible implementations, in a fourth possible implementation of the first aspect, the relay selection device is the base station; the determining link quality of a second link of each candidate relay UE in the candidate relay UE list includes: receiving first indication information sent by the first UE, where the first indication information is used to indicate the link quality of the second link of each candidate relay UE in the candidate relay UE list; and determining the link quality of the second link of each candidate relay UE in the candidate relay UE list according to the first indication information; and after the determining target relay UE from the candidate relay UE list, the method further includes: sending second indication information to the first UE, where the second indication information is used to indicate the target relay UE.

With reference to the foregoing possible implementations, in a fifth possible implementation of the first aspect, the receiving first indication information sent by the first UE includes: receiving the first indication information sent by the first UE by using temporary relay UE in the candidate relay UE list, where the temporary relay UE is determined by the first UE according to the link quality of the second link of each candidate relay UE in the candidate relay UE list; or receiving the first indication information directly sent by the first UE by using a cellular link between the first UE and the base station.

With reference to the foregoing possible implementations, in a sixth possible implementation of the first aspect, the relay selection device is the first UE.

With reference to the foregoing possible implementations, in a seventh possible implementation of the first aspect, the determining the link quality of the second link of each candidate relay UE in the candidate relay UE list includes: measuring a signal sent by each candidate relay UE in the candidate relay UE list, to obtain the link quality of the second link of each candidate relay UE.

With reference to the foregoing possible implementations, in an eighth possible implementation of the first aspect, the measuring a signal sent by each candidate relay UE in the candidate relay UE list includes: performing at least one of the following operations: measuring a DMRS included in a data packet sent by second candidate relay UE in the candidate relay UE list; or performing demodulation and decoding processing on a data packet sent by third candidate relay UE in the candidate relay UE list, and when the data packet is successfully decoded, reconstructing at least one modulation symbol according to at least one information bit obtained by means of the decoding processing, and performing measurement according to the at least one modulation symbol.

With reference to the foregoing possible implementations, in a ninth possible implementation of the first aspect, before the determining link quality of a first link of each candidate relay UE in a candidate relay UE list, the method further includes: receiving information sent by second UE, where the information is used to indicate that the second UE can serve as relay UE; and adding the second UE to the candidate relay UE list if the information sent by the second UE is successfully received.

With reference to the foregoing possible implementations, in a tenth possible implementation of the first aspect, the second UE sends the information to the first UE when determining that link quality of a wireless cellular link between the base station and the second UE is greater than a quality threshold, where the quality threshold is configured by the base station, or the quality threshold is indicated by the first UE by using indication information, or the quality threshold is predefined.

With reference to the foregoing possible implementations, in an eleventh possible implementation of the first aspect, before the determining link quality of a first link of each candidate relay UE in a candidate relay UE list, the method further includes: determining to reselect relay UE.

With reference to the foregoing possible implementations, in a twelfth possible implementation of the first aspect, the determining to reselect relay UE includes: receiving a relay reselection request sent by current relay UE of the first UE; and determining, according to the relay reselection request, to reselect relay UE.

With reference to the foregoing possible implementations, in a thirteenth possible implementation of the first aspect, the determining to reselect relay UE includes: determining current link quality of at least one of a first link or a second link of current relay UE, where the first link of the current relay UE is a radio link between the base station and the current relay UE, and the second link of the current relay UE is a radio link between the first UE and the current relay UE; and if the current link quality of the at least one of the first link or the second link of the current relay UE meets a relay reselection trigger condition, determining to reselect relay UE, where the relay reselection trigger condition includes at least one of the following conditions: current link quality of the first link of the current relay UE is less than a fourth threshold, or current link quality of the second link of the current relay UE is less than a fifth threshold, or an absolute value of a difference between current link quality of the first link of the current relay UE and current link quality of the second link of the current relay UE is greater than a sixth threshold.

According to a second aspect, another method for selecting a relay in D2D communication is provided, including: receiving, by first UE, information sent by second UE, where the information is used to indicate that the second UE can serve as relay UE; performing demodulation processing on the received information sent by the second UE, to determine whether the information sent by the second UE is successfully received; and adding the second UE to a candidate relay UE list if it is determined that the information sent by the second UE is successfully received.

In a first possible implementation of the second aspect, the second UE sends the information to the first UE when determining that link quality of a wireless cellular link between the base station and the second UE is greater than a quality threshold, where the quality threshold is configured by the base station, or the quality threshold is indicated by the first UE by using indication information, or the quality threshold is predefined.

With reference to the foregoing possible implementations, in a second possible implementation of the second aspect, the method further includes: measuring a signal sent by each candidate relay UE in the candidate relay UE list, to obtain link quality of a radio link between each candidate relay UE and the first UE; and determining target relay UE from the candidate relay UE list according to the link quality of the radio link between each candidate relay UE in the candidate relay UE list and the first UE, where the target relay UE is used for relaying data transmitted between the first UE and the base station.

With reference to the foregoing possible implementations, in a third possible implementation of the second aspect, the measuring a signal sent by each candidate relay UE in the candidate relay UE list includes: performing at least one of the following operations: measuring a DMRS included in a data packet sent by second candidate relay UE in the candidate relay UE list; or performing demodulation and decoding processing on a data packet sent by third candidate relay UE in the candidate relay UE list, and when the data packet is successfully decoded, reconstructing at least one modulation symbol according to at least one information bit obtained by means of the decoding processing, and performing measurement according to the at least one modulation symbol.

With reference to the foregoing possible implementations, in a fourth possible implementation of the second aspect, the determining target relay UE from the candidate relay UE list according to the link quality of the radio link between each candidate relay UE in the candidate relay UE list and the first UE includes: sending first indication information to the base station, where the first indication information is used to indicate the link quality of the radio link between each candidate relay UE in the candidate relay UE list and the first UE; receiving second indication information sent by the base station according to the first indication information, where the second indication information is used to indicate the target relay UE; and determining the target relay UE according to the second indication information.

According to a third aspect, another method for selecting a relay in D2D communication is provided, including: determining, by a relay reselection triggering device, current link quality of at least one of a first link or a second link, where the first link is a radio link between a base station and current relay UE, and the second link is a radio link between first UE and the current relay UE; and triggering relay UE reselection if the current link quality of the at least one of the first link or the second link meets a relay reselection trigger condition, where the relay reselection trigger condition includes at least one of the following conditions: current link quality of the first link is less than a fourth threshold, or current link quality of the second link is less than a fifth threshold, or an absolute value of a difference between current link quality of the first link and current link quality of the second link is greater than a sixth threshold.

In a first possible implementation of the third aspect, the relay reselection triggering device is the current relay UE; and the triggering relay UE reselection includes: sending a relay reselection request to the first UE or the base station.

With reference to the foregoing possible implementations, in a second possible implementation of the third aspect, the relay reselection triggering device is the first UE or the base station.

According to a fourth aspect, an apparatus for selecting a relay in device-to-device communication is provided, including: a first determining unit, configured to determine link quality of a first link of each candidate relay UE in a candidate relay UE list, where the candidate relay UE list includes at least one candidate relay UE, and the first link of each candidate relay UE is a radio link between each candidate relay UE and a base station; and a second determining unit, configured to determine target relay UE from the candidate relay UE list according to the link quality that is of the first link of each candidate relay UE in the candidate relay UE list and that is determined by the first determining unit, where the target relay UE is used for relaying data between first UE and the base station.

In a first possible implementation of the fourth aspect, the first determining unit is further configured to: before the second determining unit determines the target relay UE from the candidate relay UE list, determine link quality of a second link of each candidate relay UE in the candidate relay UE list, where the second link of each candidate relay UE is a radio link between each candidate relay UE and the first UE; and the second determining unit is specifically configured to determine the target relay UE from the candidate relay UE list according to the link quality of the first link and the link quality of the second link of each candidate relay UE in the candidate relay UE list that are determined by the first determining unit.

With reference to the foregoing possible implementation, in a second possible implementation of the fourth aspect, the second determining unit is specifically configured to determine first candidate relay UE in the candidate relay UE list as the target relay UE, where link quality of a first link of the first candidate relay UE is greater than a first threshold, and link quality of a second link of the first candidate relay UE is greater than a second threshold.

With reference to the foregoing possible implementations, in a third possible implementation of the fourth aspect, the first candidate relay UE further meets at least one of the following conditions: an absolute value of a difference between the link quality of the first link of the first candidate relay UE and the link quality of the second link of the first candidate relay UE is less than a third threshold; or the first candidate relay UE is candidate relay UE with a largest link quality sum in the candidate relay UE list, where a link quality sum of each candidate relay UE is equal to a sum of the link quality of the first link of each candidate relay UE and the link quality of the second link of each candidate relay UE; or the first candidate relay UE is candidate relay UE with a smallest link quality difference in the candidate relay UE list, where a link quality difference of each candidate relay UE is equal to an absolute value of a difference between the link quality of the first link of each candidate relay UE and the link quality of the second link of each candidate relay UE.

With reference to the foregoing possible implementations, in a fourth possible implementation of the fourth aspect, the apparatus is the base station; the apparatus further includes a first receiving unit, configured to receive first indication information sent by the first UE, where the first indication information is used to indicate the link quality of the second link of each candidate relay UE in the candidate relay UE list; the first determining unit is specifically configured to determine the link quality of the second link of each candidate relay UE in the candidate relay UE list according to the first indication information received by the first receiving unit; and the apparatus further includes a sending unit, configured to send second indication information to the first UE after the second determining unit determines the target relay UE from the candidate relay UE list, where the second indication information is used to indicate the target relay UE.

With reference to the foregoing possible implementations, in a fifth possible implementation of the fourth aspect, the first receiving unit is specifically configured to: receive the first indication information sent by the first UE by using temporary relay UE in the candidate relay UE list, where the temporary relay UE is determined by the first UE according to the link quality of the second link of each candidate relay UE in the candidate relay UE list; or receive the first indication information directly sent by the first UE by using a cellular link between the first UE and the base station.

With reference to the foregoing possible implementations, in a sixth possible implementation of the fourth aspect, the apparatus is the first UE.

With reference to the foregoing possible implementations, in a seventh possible implementation of the fourth aspect, the first determining unit is specifically configured to measure a signal sent by each candidate relay UE in the candidate relay UE list, to obtain the link quality of the second link of each candidate relay UE.

With reference to the foregoing possible implementations, in an eighth possible implementation of the fourth aspect, the first determining unit is specifically configured to perform at least one of the following operations: measuring a DMRS included in a data packet sent by second candidate relay UE in the candidate relay UE list; or performing demodulation and decoding processing on a data packet sent by third candidate relay UE in the candidate relay UE list, and when the data packet is successfully decoded, reconstructing at least one modulation symbol according to at least one information bit obtained by means of the decoding processing, and performing measurement according to the at least one modulation symbol.

With reference to the foregoing possible implementations, in a ninth possible implementation of the fourth aspect, the apparatus further includes a second receiving unit, configured to: before the first determining unit determines the link quality of the first link of each candidate relay UE in the candidate relay UE list, receive information sent by second UE, where the information is used to indicate that the second UE can serve as relay UE; where the first determining unit is further configured to add the second UE to the candidate relay UE list if the second receiving unit successfully receives the information sent by the second UE.

With reference to the foregoing possible implementations, in a tenth possible implementation of the fourth aspect, the second UE sends the information to the first UE when determining that link quality of a wireless cellular link between the base station and the second UE is greater than a quality threshold, where the quality threshold is configured by the base station, or the quality threshold is indicated by the first UE by using indication information, or the quality threshold is predefined.

With reference to the foregoing possible implementations, in an eleventh possible implementation of the fourth aspect, the first determining unit is further configured to: before determining the link quality of the first link of each candidate relay UE in the candidate relay UE list, determine to reselect relay UE.

With reference to the foregoing possible implementations, in a twelfth possible implementation of the fourth aspect, the apparatus further includes a third receiving unit, configured to receive a relay reselection request sent by current relay UE of the first UE; where the first determining unit is specifically configured to determine, according to the relay reselection request received by the third receiving unit, to reselect relay UE.

With reference to the foregoing possible implementations, in a thirteenth possible implementation of the fourth aspect, the first determining unit is specifically configured to: determine current link quality of at least one of a first link or a second link of current relay UE, where the first link of the current relay UE is a radio link between the base station and the current relay UE, and the second link of the current relay UE is a radio link between the first UE and the current relay UE; and if the current link quality of the at least one of the first link or the second link of the current relay UE meets a relay reselection trigger condition, determine to reselect relay UE, where the relay reselection trigger condition includes at least one of the following conditions: current link quality of the first link of the current relay UE is less than a fourth threshold, or current link quality of the second link of the current relay UE is less than a fifth threshold, or an absolute value of a difference between current link quality of the first link of the current relay UE and current link quality of the second link of the current relay UE is greater than a sixth threshold.

According to a fifth aspect, another apparatus for selecting a relay in D2D communication is provided, including: a receiving unit, configured to receive information sent by second UE, where the information is used to indicate that the second UE can serve as relay UE; a demodulation unit, configured to perform demodulation processing on the information that is sent by the second UE and that is received by the receiving unit, to determine whether the information sent by the second UE is successfully received; and a determining unit, configured to add the second UE to a candidate relay UE list if the demodulation unit determines that the information sent by the second UE is successfully received.

In a first possible implementation, the second UE sends the information to the apparatus when determining that link quality of a wireless cellular link between the base station and the second UE is greater than a quality threshold, where the quality threshold is configured by the base station, or the quality threshold is indicated by the apparatus by using indication information, or the quality threshold is predefined.

With reference to the foregoing possible implementations, in a second possible implementation of the fifth aspect, the apparatus further includes a measurement unit, configured to measure a signal sent by each candidate relay UE in the candidate relay UE list, to obtain link quality of a radio link between each candidate relay UE and the apparatus; where the determining unit is further configured to determine target relay UE from the candidate relay UE list according to the link quality that is of the radio link between each candidate relay UE in the candidate relay UE list and the apparatus and that is obtained by the measurement unit, where the target relay UE is used for relaying data transmitted between the apparatus and the base station.

With reference to the foregoing possible implementations, in a third possible implementation of the fifth aspect, the measurement unit is specifically configured to perform at least one of the following operations: measuring a demodulation reference signal DMRS included in a data packet sent by second candidate relay UE in the candidate relay UE list; or performing demodulation and decoding processing on a data packet sent by third candidate relay UE in the candidate relay UE list, and when the data packet is successfully decoded, reconstructing at least one modulation symbol according to at least one information bit obtained by means of the decoding processing, and performing measurement according to the at least one modulation symbol.

With reference to the foregoing possible implementations, in a fourth possible implementation of the fifth aspect, the apparatus further includes a sending unit, configured to send first indication information to the base station, where the first indication information is used to indicate the link quality of the radio link between each candidate relay UE in the candidate relay UE list and the apparatus; the receiving unit is further configured to receive second indication information sent by the base station according to the first indication information sent by the sending unit, where the second indication information is used to indicate the target relay UE; and the determining unit is specifically configured to determine the target relay UE according to the second indication information received by the receiving unit.

According to a sixth aspect, another apparatus for selecting a relay in D2D communication is provided, including: a determining unit, configured to determine current link quality of at least one of a first link or a second link, where the first link is a radio link between a base station and current relay UE, and the second link is a radio link between first UE and the current relay UE; and a triggering unit, configured to trigger relay UE reselection if the determining unit determines that the current link quality of the at least one of the first link or the second link meets a relay reselection trigger condition, where the relay reselection trigger condition includes at least one of the following conditions: current link quality of the first link is less than a fourth threshold, or current link quality of the second link is less than a fifth threshold, or an absolute value of a difference between current link quality of the first link and current link quality of the second link is greater than a sixth threshold.

In a first possible implementation of the sixth aspect, the apparatus is the current relay UE; and the triggering unit is specifically configured to send a relay reselection request to the first UE or the base station.

With reference to the foregoing possible implementation, in a second possible implementation of the sixth aspect, the apparatus is the first UE or the base station.

Based on the foregoing technical solutions, according to the method and the apparatus for selecting a relay in D2D communication that are provided in the embodiments of the present invention, the relay selection device selects, according to a specific selection criterion and the link quality of the radio link between each candidate relay UE in the candidate relay UE list and the base station, the target relay UE of the first UE from at least one candidate relay UEs included in the candidate relay UE list, so that suitable relay UE can be selected for the first UE. Therefore, overall system performance is improved.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE) system, an LTE frequency division duplex (FDD) system, an LTE Time Division Duplex (TDD), a Universal Mobile Telecommunications System (UMTS), and a Worldwide Interoperability for Microwave Access (WiMAX) communications system.

It should also be understood that in the embodiments of the present invention, user equipment (UE) may be referred to as a terminal, a mobile station (MS), a mobile terminal, or the like. The user equipment may communicate with one or more core networks by using a radio access network (RAN). For example, the user equipment may be a mobile phone (or referred to as a cellular phone) or a computer with a mobile terminal. For example, the user equipment may be a portable, pocket-sized, handheld, computer built-in, or in-vehicle mobile apparatus, or the user equipment may be any suitable device such as a satellite radio apparatus, a global positioning system, or a PDA. The user equipment exchanges voice and/or data with the radio access network.

It should also be understood that in the embodiments of the present invention, a base station may be a base transceiver station (BTS) in GSM or CDMA, or may be a NodeB (NodeB) in WCDMA, or may be an evolved NodeB (eNB, or e-NodeB) in LTE. This is not limited in the present invention.

Figure 1:
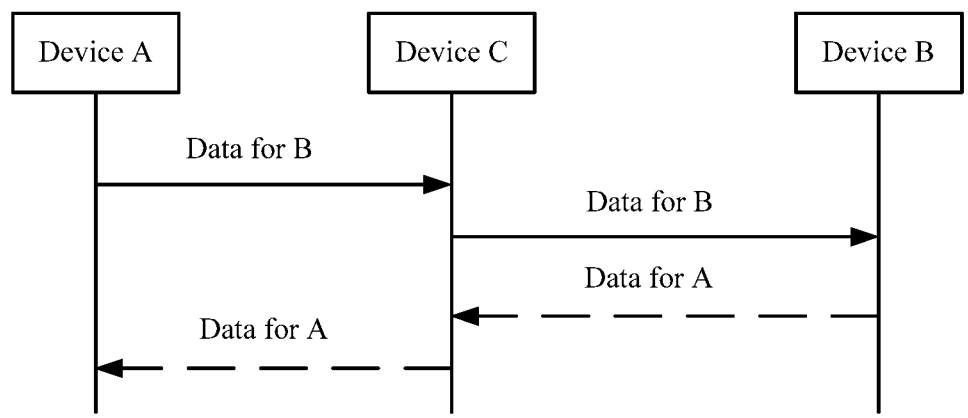
FIG. 1 shows a schematic diagram of an application scenario of a relay node in the prior art.
Figure 2:
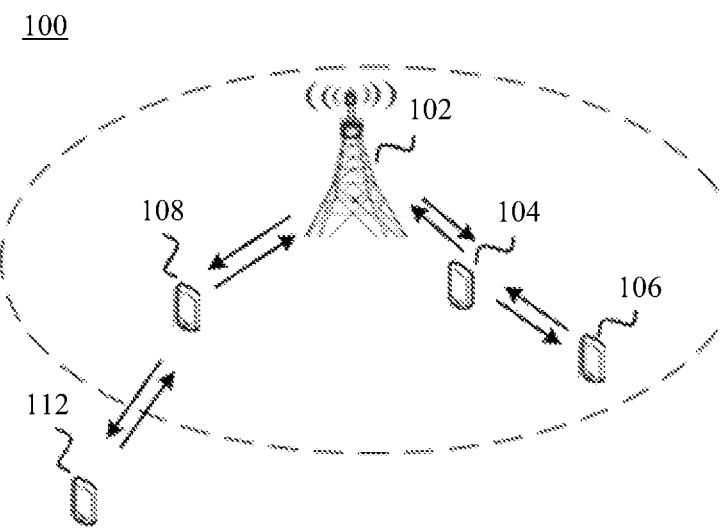
FIG. 2 shows a schematic diagram of a communications system to which an embodiment of the present invention is applied.

FIG. 2 shows an example architecture of a communications system 100 to which an embodiment of the present invention is applied. The communications system 100 may include one or more base stations. FIG. 2 shows a base station 102 as an example. The base station 102 may include one or more antenna groups, and each antenna group may include one or more antennas. The base station 102 may additionally include a transmitter chain and a receiver chain. A person of ordinary skill in the art may understand that the transmitter chain and the receiver chain each may include multiple components (for example, a processor, a modulator, a multiplexer, a demodulator, a demultiplexer, or an antenna) related to signal sending and reception.

The communications system 100 may further include multiple UEs, and the base station 102 may communicate with some or all of the multiple UEs. FIG. 2 shows four UEs as an example. UE 104, UE 106, and UE 108 all fall within coverage of the base station 102, and UE 112 falls beyond the coverage of the base station 102. However, it may be understood that the base station 102 may communicate with any quantity of user equipments similar to the UE 104 to the UE 112.

In the system 100, communication between the UE 104 and the UE 106 and communication between the UE 112 and the UE 108 may be device-to-device (D2D) communication. A link for direct data transmission between two UEs may be referred to as a D2D link, a sidelink, or a PC5 link. This is not limited in this embodiment of the present invention. During D2D communication between UEs in a network, that is, UEs that can establish an RRC connection to the base station 102 and/or that can successfully receive a broadcast message sent by the base station 102, for example, the UE 104 and the UE 106, the base station 102 may allocate a resource used in the D2D communication. A resource used for D2D communication of UE outside the network, for example, the UE 112 may be associated, by using the UE 108, with a resource configured by the base station 102, or may be predefined. This is not limited in this embodiment of the present invention.

In the system 100, data sent between multiple UEs by using a D2D link may be sent in a broadcast manner or may be sent in a unicast manner. When data transmitted on the D2D link is sent in a broadcast manner, target UE that receives the data may not be limited. Accordingly, UE may receive and demodulate a transmitted signal in which the UE is interested. Further, data sent by UE by using a D2D link may be data used for D2D communication or may be data used for D2D discovery. This is not limited in this embodiment of the present invention.

The four UEs shown in FIG. 2 may include one or more UEs that can serve as relay UE. Whether UE can serve as relay UE may be determined according to a processing capability, a current load status, a current electric quantity, and the like of the UE and/or a configuration of the base station. For example, the UE 104 and the UE 108 can serve as relay UE of another UE. However, this is not limited in this embodiment of the present invention.

To expand the coverage of the base station 102, UE in the coverage of the base station 102 may be used to assist in communication between the UE 112 and the base station 102, that is, the UE (for example, the UE 108) serves as relay UE between the UE 112 and the base station 102. In this case, when the base station 102 needs to send downlink data to the UE 112, the base station 102 may send the downlink data to the relay UE, and after receiving the downlink data, the relay UE may forward the downlink data to the UE 112. Similarly, the relay UE may also forward, to the base station 102, received uplink data sent by the UE 112.

In addition, if quality of a channel between UE and the base station 102 is relatively low, or UE is located on the edge of the coverage of the base station 102, or UE tends to leave the network (this may be determined from a moving speed and a moving direction), or UE expects another UE to help forward a signal so as to reduce transmit power of the UE although signal quality of the UE is relatively high, or the like, relay UE may be used to assist in communication between the UE and the base station 102. For example, as shown in FIG. 2, the UE 106 is located on the edge of the coverage of the base station 102, to improve quality of communication between the UE 106 and the base station 102, UE (for example, the UE 104) with relatively high signal quality may serve as relay UE between the base station 102 and the UE 106. However, this is not limited in this embodiment of the present invention.

In the system 100, relay UE may be discovered in multiple manners. Optionally, UE (for example, the UE 104) that can serve as relay UE may send a predefined message, data packet, or sequence periodically or by means of event triggering, so that another UE can detect the predefined message, data packet, or sequence, and therefore, determine the UE 104 as candidate relay UE. Accordingly, UE may periodically detect or blindly detect a predefined message, data packet, or sequence, so as to discover UE that can serve as relay UE and that is around the UE. In another optional embodiment, when UE (for example, the UE 106) needs to send data, the UE 106 may send a specific message or sequence. After receiving the specific message or sequence, UE that can serve as relay UE may return a response message or a response sequence to the UE 106. In this case, the UE 106 may determine, according to the received response message or the received response message, UE that can serve as relay UE and that is around the UE. However, this is not limited in this embodiment of the present invention.

Because there are multiple UEs in the coverage of the base station 102, the following case is likely to occur: UE discovers multiple UEs around that can serve as relay UE. However, the prior art does not provide a technical solution of how to determine target relay UE from the discovered at least one candidate relay UEs.

Figure 3:
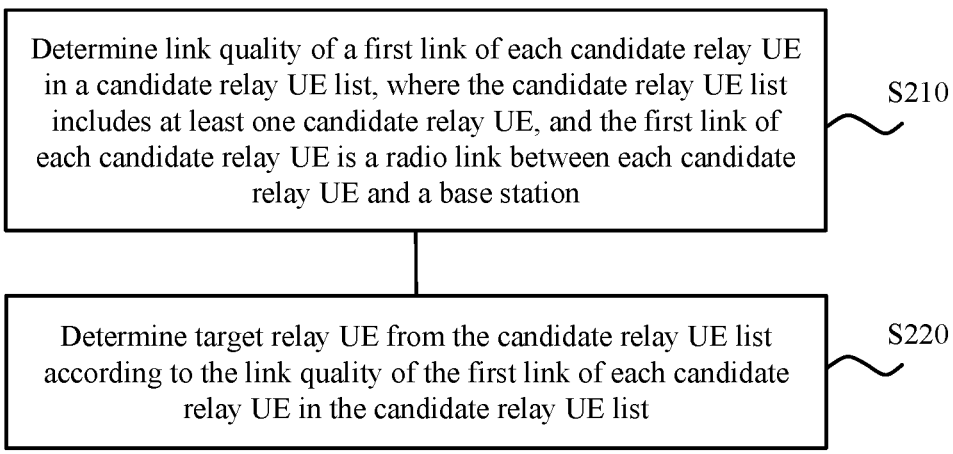
FIG. 3 shows a schematic flowchart of a method for selecting a relay in D2D communication according to an embodiment of the present invention.

FIG. 3 is a schematic flowchart of a method 200 for selecting a relay in D2D communication according to an embodiment of the present invention. The method 200 is used to select relay UE of first UE, and the relay UE is used to assist in communication between the first UE and a base station. The method 200 may be executed by a relay selection device. The relay selection device may be the first UE, the base station, or another independent relay selection network element. This is not limited in this embodiment of the present invention.

S210. Determine link quality of a first link of each candidate relay UE in a candidate relay UE list, where the candidate relay UE list includes at least one candidate relay UE, and the first link of each candidate relay UE is a radio link between each candidate relay UE and the base station.

The relay selection device may determine the candidate relay UE list of the first UE. The candidate relay UE list includes one or more candidate relay UEs. Specifically, the relay selection device may determine the candidate relay UE list in multiple manners. For example, if the relay selection device is the base station, the relay selection device may determine the candidate relay UE list according to indication information sent by the first UE or a network configuration. If the relay selection device is the first UE, the relay selection device may receive indication information that is sent by a network side device (for example, the base station) and that is used to indicate the candidate relay UE list; or the relay selection device may determine the candidate relay UE list according to a received predefined data packet, message, sequence, or response message sent by at least one second UE. However, this is not limited in this embodiment of the present invention.

In this embodiment of the present invention, a first link of candidate relay UE may be a wireless cellular link between the candidate relay UE and the base station. The relay selection device may determine the link quality of the first link of each candidate relay UE in the candidate relay UE list in multiple manners. Optionally, the relay selection device may receive a first measurement report sent by each candidate relay UE in the candidate relay UE list. The first measurement report is used to indicate link quality of the cellular link between the candidate relay UE and the base station. The link quality may be indicated by using at least one of the following parameters: reference signal received power (RSRP), reference signal received quality (RSRQ), a received signal strength indicator (RSSI), or a channel quality indication (CQI); or the link quality may be indicated by using another parameter. This is not limited in this embodiment of the present invention. Specifically, each candidate relay UE in the candidate relay UE list may measure a signal sent by the base station, to obtain the link quality of the wireless cellular link between each candidate relay UE and the base station. In addition, each candidate relay UE in the candidate relay UE list may actively send the first measurement report to the relay selection device, or may send the first measurement report to the relay selection device according to an instruction sent by the relay selection device. However, this is not limited in this embodiment of the present invention.

In another optional embodiment, the relay selection device may be the base station. In this case, alternatively, the relay selection device may measure a signal sent by each candidate relay UE in the candidate relay UE list, to obtain the link quality of the cellular link between each candidate relay UE and the base station. Candidate relay UE in the candidate relay UE list may send a signal periodically or by means of event triggering. For example, the candidate relay UE may send the signal to the base station when receiving instruction information that is sent by the base station and that is used to instruct to send the signal to the base station. However, this is not limited in this embodiment of the present invention.

In another optional embodiment, the relay selection device may be the first UE. In this case, alternatively, the relay selection device may receive indication information sent by the base station. The indication information is used to indicate the link quality of the first link of each candidate relay UE in the candidate relay UE list. Specifically, the base station may actively send the indication information to the relay selection device, or may send the indication information to the relay selection device according to a request of the relay selection device. This is not limited in this embodiment of the present invention.

S220. Determine target relay UE from the candidate relay UE list according to the link quality of the first link of each candidate relay UE in the candidate relay UE list.

The relay selection device may determine, according to the link quality of the first link of each candidate relay UE in the candidate relay UE list by using a specific selection criterion, the target relay UE from the at least one candidate relay UE included in the candidate relay UE list. For example, the relay selection device may determine, as the target relay UE, candidate relay UE that is in the candidate relay UE list and whose first link has link quality that is greater than a threshold. If the candidate relay UE list includes at least one candidate relay UEs that meet the condition, that is, the candidate relay UE list includes at least one candidate relay UEs whose first links have link quality that is greater than the threshold, the relay selection device may further select the target relay UE from the at least one candidate relay UEs that meet the condition, for example, randomly select the target relay UE from the at least one candidate relay UEs that meet the condition. However, this is not limited in this embodiment of the present invention. Alternatively, the relay selection device may determine, as the target relay UE, candidate relay UE that is in the candidate relay UE list and whose first link has highest link quality. This is not limited in this embodiment of the present invention. The selection criterion may be preconfigured by the base station or predefined. This is not limited in this embodiment of the present invention.

Therefore, according to the method for selecting a relay in D2D communication in this embodiment of the present invention, the relay selection device selects, according to the specific selection criterion and the link quality of the radio link between each candidate relay UE in the candidate relay UE list and the base station, the target relay UE of the first UE from at least one candidate relay UEs included in the candidate relay UE list, so that suitable relay UE can be selected for the first UE. Therefore, overall system performance is improved.

In this embodiment of the present invention, optionally, UE that can serve as relay UE may send information periodically or by means of event triggering. The information may be used to indicate that the UE can serve as relay UE, so that another UE can discover the UE and determine whether to use the UE as target relay UE. For example, the information may be a predefined data packet, message, or sequence. Accordingly, the relay selection device (for example, the first UE) may receive information sent by at least one other UE different from the first UE, and determine, according to the received information, whether to use the at least one other UE as candidate relay UE of the first UE. Optionally, the relay selection device may determine another UE as candidate relay UE of the first UE provided that the relay selection device receives information sent by the another UE. Alternatively, after receiving information sent by another UE, the relay selection device may perform demodulation and/or decoding processing on the received information, to determine whether the information is successfully received; and determine the another UE as candidate relay UE of the first UE only when determining that the information sent by the another UE is successfully received. The information sent by the UE may be a specific message, sequence, or data packet. However, this is not limited in this embodiment of the present invention.

In an optional embodiment, before S210, the method 200 further includes:
receiving information sent by second UE, where the information is used to indicate that the second UE can serve as relay UE; and
adding the second UE to the candidate relay UE list if the information sent by the second UE is successfully received.

The relay selection device may determine the second UE as candidate relay UE only when determining that the first UE can successfully receive the information sent by the second UE, and then determine link quality of a first link of the second UE, so that workload and complexity of a subsequent process are prevented from increasing because unsuitable UE is added to the candidate relay UE list.

In this embodiment of the present invention, the second UE may broadcast the information, or directly send the information to the first UE by using a wireless communications link between the second UE and the first UE (for example, a D2D link between the second UE and the first UE). This is not limited in this embodiment of the present invention. In addition, in this embodiment of the present invention, the second UE may send the information provided that the second UE determines that the second UE has a capability of serving as relay UE, or may send the information only when determining that link quality of a cellular link between the second UE and the base station is relatively high. This is not limited in this embodiment of the present invention.

In an optional embodiment, the second UE sends the information to the first UE when determining that the link quality of the cellular link between the base station and the second UE is greater than a quality threshold, where the quality threshold is configured by the base station, or the quality threshold is indicated by the first UE by using indication information, or the quality threshold is predefined.

Specifically, the second UE may measure a signal sent by the base station, to determine the link quality of the wireless cellular link between the base station and the second UE; and send the information to the first UE when determining that the link quality is greater than the quality threshold. The quality threshold may be preconfigured by the base station or predefined, or the second UE may determine the quality threshold according to received indication information that is sent by the first UE and that is used to indicate the quality threshold. The indication information may be carried in a broadcast message and sent. However, this is not limited in this embodiment of the present invention.

Figure 4:
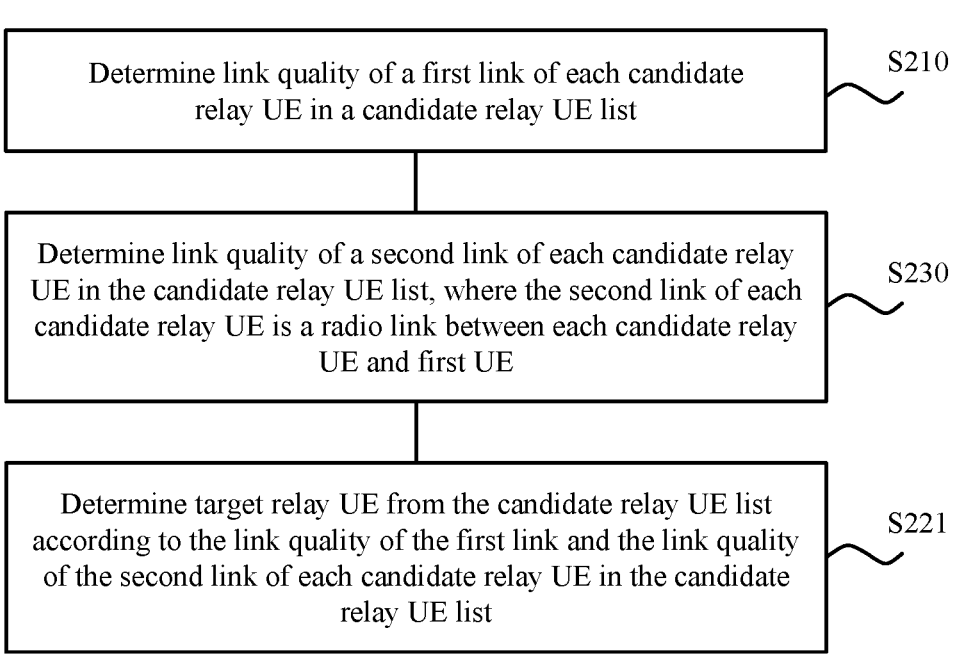
FIG. 4 shows a schematic flowchart of a method for selecting a relay in D2D communication according to another embodiment of the present invention.

In this embodiment of the present invention, the relay selection device may determine the target relay UE from the candidate relay UE list in multiple manners. In another optional embodiment, as shown in FIG. 4, before S220, the method 200 further includes the following step.

S230. Determine link quality of a second link of each candidate relay UE in the candidate relay UE list, where the second link of each candidate relay UE is a radio link between each candidate relay UE and the first UE.

Accordingly, S220 of the determining target relay UE from the candidate relay UE list according to the link quality of the first link of each candidate relay UE in the candidate relay UE list includes the following step.

S221. Determine the target relay UE from the candidate relay UE list according to the link quality of the first link and the link quality of the second link of each candidate relay UE in the candidate relay UE list.

A second link of candidate relay UE may be a wireless communications link between the candidate relay UE and the first UE, and the wireless communications link may also be referred to as a sidelink or a PC5 link or a D2D link. The relay selection device may determine the link quality of the second link of each candidate relay UE in the candidate relay UE list in multiple manners. Optionally, the relay selection device may receive a second measurement report sent by each candidate relay UE in the candidate relay UE list. The second measurement report is used to indicate link quality of the wireless communications link between the candidate relay UE and the first UE. The link quality may be indicated by using at least one of the following parameters: RSRP, RSRQ, an RSSI, or a CQI; or the link quality may be indicated by using another parameter. This is not limited in this embodiment of the present invention. Specifically, each candidate relay UE in the candidate relay UE list may measure a signal sent by the first UE, to obtain the link quality of the wireless communications link between each candidate relay UE and the first UE. The signal may include a synchronization signal, a reference signal (for example, a demodulation reference signal), or another signal. The demodulation reference signal may be a demodulation reference signal sent on a broadcast channel or a demodulation reference signal carried in a data packet. This is not limited in this embodiment of the present invention. In addition, each candidate relay UE in the candidate relay UE list may actively send the second measurement report to the relay selection device, or may send the second measurement report to the relay selection device according to an instruction sent by the relay selection device. However, this is not limited in this embodiment of the present invention.

In another optional embodiment, the relay selection device may be the base station. In this case, S230 of the determining link quality of a second link of each candidate relay UE in the candidate relay UE list includes:

receiving first indication information sent by the first UE, where the first indication information is used to indicate the link quality of the second link of each candidate relay UE in the candidate relay UE list; and determining the link quality of the second link of each candidate relay UE in the candidate relay UE list according to the first indication information.

Accordingly, after S221, the method 200 further includes:

sending second indication information to the first UE, where the second indication information is used to indicate the target relay UE.

The first UE may measure a signal sent by each candidate relay UE in the candidate relay UE list, to obtain the link quality of the wireless communications link between each candidate relay UE and the first UE, and then send the first indication information to the base station. The first UE may actively send the first indication information to the base station, or send the first indication information to the base station according to an instruction of the base station. This is not limited in this embodiment of the present invention.

After determining the target relay UE, the base station may send the second indication information to the first UE, so as to notify the first UE of the target relay UE determined by the base station. Optionally, the base station may send the second indication information to the first UE by using the target relay UE. Alternatively, if the first UE falls within coverage of the base station, the base station may directly send the second indication information to the first UE by using a wireless cellular link between the base station and the first UE. However, this is not limited in this embodiment of the present invention.

In this embodiment of the present invention, the first UE may determine the link quality of the second link of each candidate relay UE in the candidate relay list in multiple manners. In an optional embodiment, the first UE may measure a demodulation reference signal carried in a data packet sent by candidate relay UE. The data packet may be used to implement mutual discovery between the first UE and the relay UE. Optionally, provided that the first UE receives the data packet, the first UE measures the demodulation reference signal carried in the data packet. Alternatively, after receiving the data packet, the first UE may perform decoding processing on an original complex symbol corresponding to the data packet, and after successful decoding, reconstruct information obtained by means of the decoding, and measure the reconstructed information. Specifically, after the successful decoding, the first UE may perform encoding in an encoding manner that is the same as that at a transmit end of the data packet, and modulate, by using a modulation scheme (for example, QPSK or 16QAM) that is the same as that at the transmit end of the data packet, some or all bits obtained by means of the encoding, to reconstruct at least one complex symbol obtained after baseband modulation on a corresponding side of a transmitter. Optionally, the first UE multiplies the at least one complex symbol by a channel estimation value obtained before the data packet is demodulated, to generate a complex symbol that is of the data packet received by a receiver on a baseband and on which balancing is not performed. The first UE measures signal quality by using the reconstructed complex symbol as a known sequence. Optionally, a measurement result of measuring the signal quality by the first UE by using the reconstructed complex symbol may be calculated by using the reconstructed complex symbol and the received original complex symbol. For example, a related operation is performed on the reconstructed complex symbol and the original complex symbol; or after conjugate multiplying is performed on the reconstructed complex symbol and the original complex symbol, accumulation is performed on each orthogonal frequency division multiplexing (OFDM) symbol, to obtain energy of each symbol, and then, energy of all the symbols is averaged. However, this is not limited in the present invention.

The first UE may send the first indication information to the base station in multiple manners. In an optional embodiment, the receiving first indication information sent by the first UE includes:

receiving the first indication information sent by the first UE by using temporary relay UE in the candidate relay UE list, where the temporary relay UE is determined by the first UE according to the link quality of the second link of each candidate relay UE in the candidate relay UE list; or receiving the first indication information directly sent by the first UE by using a cellular link between the first UE and the base station.

The first UE may select temporary relay UE from the candidate relay UE list, and send the first indication information to the base station by using the temporary relay UE. Optionally, the first UE may randomly select the temporary relay UE from the candidate relay UE list, or the first UE may select the temporary relay UE from the candidate relay UE list according to the link quality of the first link and/or the link quality of the second link of each candidate relay UE in the candidate relay UE list. For example, the first UE may determine, as the temporary relay UE, candidate relay UE that is in the candidate relay UE list and whose first link has link quality that exceeds a specific threshold and/or whose second link has link quality that exceeds a specific threshold. If the candidate relay UE list includes at least one candidate relay UEs that meet the condition, the first UE may further randomly select the temporary relay UE from the at least one candidate relay UEs, or determine, as the temporary relay UE, candidate relay UE that is in the at least one candidate relay UEs and whose first link has highest link quality and/or whose second link has highest link quality. However, this is not limited in this embodiment of the present invention.

In S221, the relay selection device may select the target relay UE from the candidate relay UEs according to the specific selection criterion and according to the link quality of the first link and the link quality of the second link of each candidate relay UE in the candidate relay UE list. The selection criterion may be determined according to a network transmission requirement. In an optional embodiment, S221 of the determining the target relay UE from the candidate relay UE list according to the link quality of the first link and the link quality of the second link of each candidate relay UE in the candidate relay UE list includes:

determining first candidate relay UE in the candidate relay UE list as the target relay UE, where link quality of a first link of the first candidate relay UE is greater than a first threshold, and link quality of a second link of the first candidate relay UE is greater than a second threshold.

In this case, the selection criterion may specifically include the following conditions: Link quality of a first link is greater than the first threshold, and link quality of a second link is greater than the second threshold.

In another optional embodiment, the first candidate relay UE further meets at least one of the following conditions:

an absolute value of a difference between the link quality of the first link of the first candidate relay UE and the link quality of the second link of the first candidate relay UE is less than a third threshold; or the first candidate relay UE is candidate relay UE with a largest link quality sum in the candidate relay UE list, where a link quality sum of each candidate relay UE is equal to a sum of the link quality of the first link of each candidate relay UE and the link quality of the second link of each candidate relay UE; or the first candidate relay UE is candidate relay UE with a smallest link quality difference in the candidate relay UE list, where a link quality difference of each candidate relay UE is equal to an absolute value of a difference between the link quality of the first link of each candidate relay UE and the link quality of the second link of each candidate relay UE.

In this case, the selection criterion for the target relay UE may include a condition 1: The link quality of the first link is greater than the first threshold, and may further include at least one of the following conditions:

a condition 2: The link quality of the second link is greater than the second threshold; or a condition 3: An absolute value of a difference between the link quality of the first link and the link quality of the second link is less than the third threshold; or a condition 4: A difference between the link quality of the first link and the link quality of the second link is the smallest; or a condition 5: A sum of the link quality of the first link and the link quality of the second link is the largest.

Specifically, the condition 1 may be used to ensure that the link quality of the first link of the selected target relay UE meets a communication requirement, the condition 2 may be used to ensure that the link quality of the second link of the target relay UE meets a communication requirement, the condition 3 may be used to ensure that the link quality of the first link and the link quality of the second link of the target relay UE are basically balanced, the condition 4 may be used to ensure that the link quality of the first link and the link quality of the second link of the target relay UE are the most balanced, and the condition 5 may be used to ensure that a total transmission capability corresponding to the link quality of the first link and the link quality of the second link of the target relay UE is the highest. At least one of the first threshold to the fifth threshold may be predefined; or if the relay selection device is the first UE, the first UE may determine at least one of the first threshold to the fifth threshold according to an indication of the base station. However, this is not limited in this embodiment of the present invention.

Optionally, the relay selection device may determine the target relay device by using another selection criterion. This is not limited in this embodiment of the present invention.

The method 200 may be used for initial selection of relay UE of the first UE, or may be used for reselection of relay UE of the first UE. This is not limited in this embodiment of the present invention.

In this embodiment of the present invention, the relay selection device may determine, in multiple manners, to reselect relay UE. In an optional embodiment, the determining to reselect relay UE includes:

receiving a relay reselection request sent by current relay UE of the first UE; and determining, according to the relay reselection request, to reselect relay UE.

In this case, serving as the current relay UE of the first UE, the current relay UE triggers reselection of relay UE of the first UE. The current relay UE may determine, in multiple manners, to trigger the reselection of relay UE of the first UE. For example, the current relay UE may determine current link quality of a wireless cellular link between the current relay UE and the base station (that is, a first link of the current relay UE), and/or determine current link quality of a wireless communications link between the current relay UE and the first UE (that is, a second link of the current relay UE), and when the current link quality of the first link and/or the current link quality of the second link of the current relay UE meet/meets a specific condition, trigger the reselection of relay UE of the first UE, that is, send the relay reselection request to the relay selection device, to request the relay selection device to reselect relay UE for the first UE. However, this is not limited in this embodiment of the present invention.

In another optional embodiment, the determining to reselect relay UE includes:
  determining current link quality of at least one of a first link or a second link of current relay UE, where the first link of the current relay UE is a radio link between the base station and the current relay UE, and the second link of the current relay UE is a radio link between the first UE and the current relay UE; and
  if the current link quality of the at least one of the first link or the second link of the current relay UE meets a relay reselection trigger condition, determining to reselect relay UE, where the relay reselection trigger condition includes at least one of the following conditions: current link quality of the first link of the current relay UE is less than a fourth threshold, or current link quality of the second link of the current relay UE is less than the fifth threshold, or an absolute value of a difference between current link quality of the first link of the current relay UE and current link quality of the second link of the current relay UE is greater than a sixth threshold.

The relay reselection trigger condition may have another form. This is not limited in this embodiment of the present invention. Specifically, the relay selection device may receive a third measurement report sent by the current relay UE. The third measurement report may be used to indicate the current link quality of the first link and/or the current link quality of the second link of the current relay UE. The current relay UE may actively send the third measurement report, or send the third measurement report according to an instruction of the relay selection device. This is not limited in this embodiment of the present invention. Optionally, if the relay selection device is the base station, the relay selection device may measure a signal sent by the current relay UE on the wireless cellular link between the current relay UE and the base station, to obtain the current link quality of the first link of the current relay UE. If the relay selection device is the first UE, the relay selection device may measure a signal sent by the current relay UE on a D2D link between the current relay UE and the first UE, to obtain the current link quality of the second link of the current relay UE. However, this is not limited in this embodiment of the present invention.

After determining the current link quality of the first link and/or the current link quality of the second link of the current relay UE, the relay selection device may determine whether the current link quality of the first link and/or the current link quality of the second link of the current relay UE meet/meets the relay reselection trigger condition, and perform or trigger reselection of relay UE of the first UE when determining that the current link quality of the first link and/or the current link quality of the second link of the current relay UE meet/meets the relay reselection trigger condition. However, this is not limited in this embodiment of the present invention.

Therefore, according to the method for selecting a relay in D2D communication in this embodiment of the present invention, the relay selection device selects, according to the specific selection criterion and the link quality of the radio link between each candidate relay UE in the candidate relay UE list and the base station, the target relay UE of the first UE from the at least one candidate relay UEs included in the candidate relay UE list, so that suitable relay UE can be selected for the first UE. Therefore, overall system performance is improved.

In addition, the first UE determines second UE as candidate relay UE only when successfully receiving information sent by the second UE, so that workload and complexity of a subsequent process can be prevented from increasing because unsuitable UE is added to the candidate relay UE list.

Figure 5:
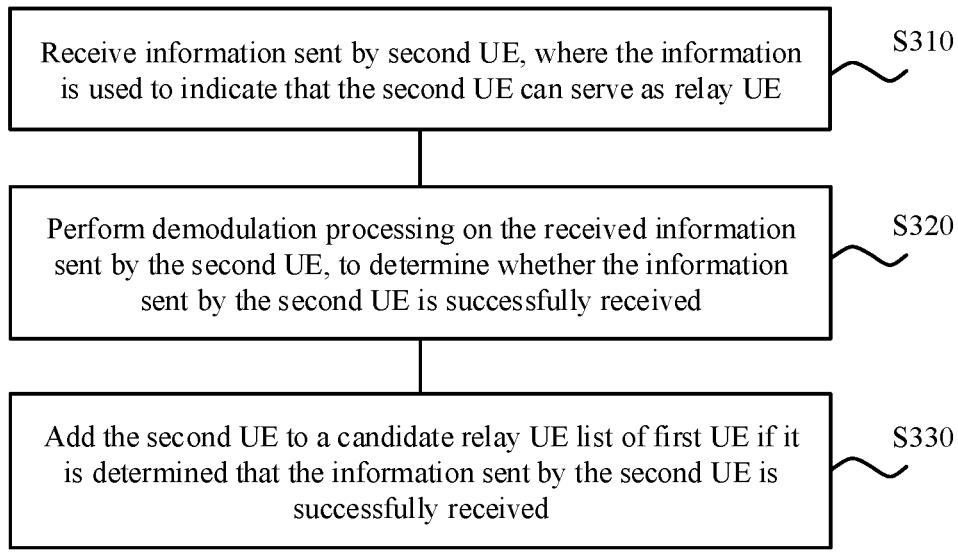
FIG. 5 shows a schematic flowchart of a method for selecting a relay in D2D communication according to another embodiment of the present invention.

FIG. 5 shows a method 300 for selecting a relay in D2D communication according to another embodiment of the present invention. The method 300 is used to select relay UE of first UE, and may be used for initial selection or reselection of the relay UE of the first UE. The method may be executed by the first UE.

S310. Receive information sent by second UE, where the information is used to indicate that the second UE can serve as relay UE.

When the second UE has a capability of serving as relay UE, a current load status of the second UE can allow the second UE to serve as relay UE, the second UE has a relay transmission capability, and a current electric quantity of the second UE can allow the second UE to serve as relay UE. However, this is not limited in this embodiment of the present invention.

The first UE may determine, according to the information, that the second UE has the capability of serving as relay UE of the first UE. Optionally, the second UE may periodically send the information. For example, the information is a predefined message, data packet, or sequence. In addition, the second UE may broadcast the information, so that another UE can discover the second UE. Alternatively, the second UE may send the information by means of event triggering. For example, when the first UE has to-be-sent uplink data (that is, the first UE needs to send data to a base station), the first UE may send a specific message to another UE. When receiving the specific message, the second UE determines that the second UE has the capability of serving as relay UE of the first UE, and returns a response message to the first UE. Accordingly, the first UE may determine, according to the response message, that the second UE can and is willing to serve as relay UE of the first UE. However, this is not limited in this embodiment of the present invention.

S320. Perform demodulation processing on the received information sent by the second UE, to determine whether the information sent by the second UE is successfully received.

The first UE may perform processing such as demodulation and decoding on the received information, and determine, according to a processing result, whether the information is successfully received. If the first UE determines that the information is successfully received, the first UE may perform S330. Otherwise, the first UE may discard the information, and does not use the second UE as candidate relay UE.

S330. Add the second UE to a candidate relay UE list of the first UE if it is determined that the information sent by the second UE is successfully received.

Therefore, according to the method for selecting a relay in D2D communication in this embodiment of the present invention, when receiving the information sent by the second UE, the first UE determines whether the information sent by the second UE is successfully received, and determines the second UE as candidate relay UE only when determining that the information sent by the second UE is successfully received, so that workload and complexity of a subsequent process can be prevented from increasing because unsuitable UE is added to the candidate relay UE list.

In an optional embodiment, the second UE sends the information to the first UE when determining that link quality of a cellular link between the base station and the second UE is greater than a quality threshold, where the quality threshold is configured by the base station, or the quality threshold is indicated by the first UE by using a broadcast message, or the quality threshold is predefined.

After determining the candidate relay UE list, the first UE may determine link quality of a wireless communications link between each candidate relay UE in the candidate relay UE list and the first UE. In an optional embodiment, the method 300 further includes:

measuring a signal sent by each candidate relay UE in the candidate relay UE list, to obtain the link quality of the radio link between each candidate relay UE and the first UE; and determining target relay UE from the candidate relay UE list according to the link quality of the radio link between each candidate relay UE in the candidate relay UE list and the first UE, where the target relay UE is used for relaying data transmitted between the first UE and the base station.

In another optional embodiment, the determining target relay UE from the candidate relay UE list according to the link quality of the radio link between each candidate relay UE in the candidate relay UE list and the first UE includes:

sending first indication information to the base station, where the first indication information is used to indicate the link quality of the radio link between each candidate relay UE in the candidate relay UE list and the first UE; and receiving second indication information sent by the base station according to the first indication information, where the second indication information is used to indicate the target relay UE.

For a manner of selecting the target relay UE by the first UE, refer to descriptions of the method 200 above. For brevity, details are not described herein again.

Therefore, according to the method for selecting a relay in D2D communication in this embodiment of the present invention, when receiving the information sent by the second UE, the first UE determines whether the information sent by the second UE is successfully received, and determines the second UE as candidate relay UE only when determining that the information sent by the second UE is successfully received, so that workload and complexity of a subsequent process can be prevented from increasing because unsuitable UE is added to the candidate relay UE list.

Figure 6:
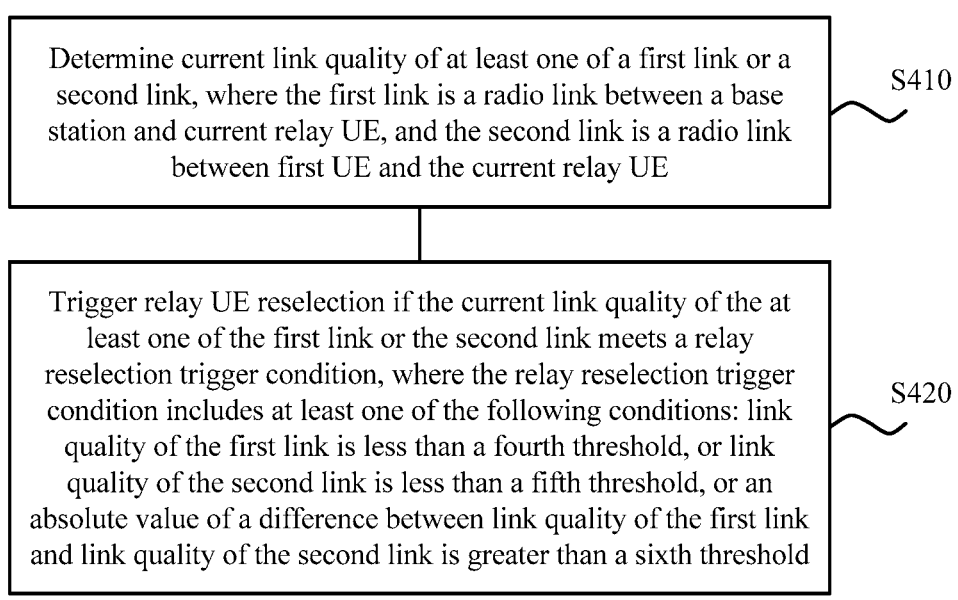
FIG. 6 shows a schematic flowchart of a method for selecting a relay in D2D communication according to another embodiment of the present invention.

FIG. 6 shows a method 400 for selecting a relay in D2D communication according to another embodiment of the present invention. The method 400 may trigger reselection of relay UE of first UE. The method 400 may be executed by a relay reselection triggering device. The relay reselection triggering device may be a base station, the first UE, current relay UE of the first UE, or an independent reselection triggering network element. This is not limited in this embodiment of the present invention.

S410. Determine current link quality of at least one of a first link or a second link, where the first link is a radio link between the base station and the current relay UE, and the second link is a radio link between the first UE and the current relay UE.

S420. Trigger relay UE reselection if the current link quality of the at least one of the first link or the second link meets a relay reselection trigger condition, where the relay reselection trigger condition includes at least one of the following conditions: link quality of the first link is less than a fourth threshold, or link quality of the second link is less than a fifth threshold, or an absolute value of a difference between link quality of the first link and link quality of the second link is greater than a sixth threshold.

Optionally, the relay reselection triggering device is the current relay UE. In this case, S620 of the triggering relay UE reselection includes: sending a relay reselection request to the first UE or the base station.

The relay reselection request may be used to request the first UE or the base station to reselect relay UE. Accordingly, the first UE or the base station may execute the method 200 to reselect relay UE. However, this is not limited in this embodiment of the present invention.

Optionally, the current relay UE may measure a signal sent by the base station on the wireless cellular link between the base station and the current relay UE, to obtain the current link quality of the first link of the current relay UE. In addition, the relay selection triggering device may also measure a signal sent by the first UE on a D2D link between the first UE and the current relay UE, to obtain the current link quality of the second link of the current relay UE. However, this is not limited in this embodiment of the present invention.

If the relay reselection triggering device is the first UE, that the first UE triggers the relay UE reselection may be specifically sending a relay reselection request to the base station, to request the base station to reselect relay UE for the first UE; or that the first UE triggers the relay UE reselection may be specifically that the first UE unicasts or broadcasts a specific message to multiple other UEs, so that another UE that is willing to serve as relay UE of the first UE returns a response message to the first UE; or that the first UE triggers the relay UE reselection may be specifically that the first UE selects relay UE. This is not limited in this embodiment of the present invention.

The first UE may determine the current link quality of the first link and/or the current link quality of the second link of the current relay UE in multiple manners. Optionally, the first UE may receive first indication information sent by the current relay UE. The first indication information may be used to indicate the current link quality of the first link and/or the current link quality of the second link of the current relay UE. The current relay UE may actively send the first indication information, or send the first indication information according to an instruction of the first UE. Optionally, the first UE may receive second indication information actively sent by the base station or second indication information sent according to a request of the first UE. The second indication information is used to indicate the link quality of the first link of the current relay UE. Optionally, the first UE may also measure a signal sent by the current relay UE on a D2D link between the current relay UE and the first UE, to obtain the current link quality of the second link of the current relay UE. However, this is not limited in this embodiment of the present invention.

If the relay reselection triggering device is the base station, that the base station triggers the relay UE reselection may be specifically sending a relay reselection instruction to the first UE, to instruct the first UE to reselect relay UE; or that the base station triggers the relay UE reselection may be specifically that the base station selects relay UE. This is not limited in this embodiment of the present invention.

The base station may determine the current link quality of the first link and/or the current link quality of the second link of the current relay UE in multiple manners. Optionally, the base station may receive a measurement report sent by the current relay UE. The measurement report may be used to indicate the current link quality of the first link and/or the current link quality of the second link of the current relay UE. The current relay UE may actively send the measurement report, or send the measurement report according to an instruction of the base station. Optionally, the base station may receive a measurement report actively sent by the first UE or sent according to an instruction of the base station. The measurement report may be used to indicate the link quality of the first link of the current relay UE. Optionally, the first UE may measure a signal sent by the current relay UE on the wireless cellular link between the current relay UE and the base station, to obtain the current link quality of the first link of the current relay UE. However, this is not limited in this embodiment of the present invention.

For a manner of reselecting the relay UE by the first UE or the base station, refer to descriptions of the method 200 and the method 300 above. For brevity, details are not described herein again.

Therefore, according to the method for selecting UE in this embodiment of the present invention, the relay UE reselection is triggered when it is determined that the current link quality of the first link and/or the current link quality of the second link of the current relay UE meet/meets the relay reselection trigger condition, so that communication between the first UE and the base station can be prevented from being affected because the current link quality of the first link and/or the current link quality of the second link of the current relay UE are/is relatively low. Therefore, overall system performance is improved, and user experience is enhanced.

With reference to specific examples, the following provides more detailed descriptions of the method for selecting a relay in D2D communication provided in the embodiments of the present invention. For ease of description, in the examples shown in FIG. 7 to FIG. 11, it is assumed that a base station is an eNB, and first UE is remote UE (remote UE). The remote UE may fall within or beyond coverage of the eNB. However, this is not limited in this embodiment of the present invention.

Figure 7:
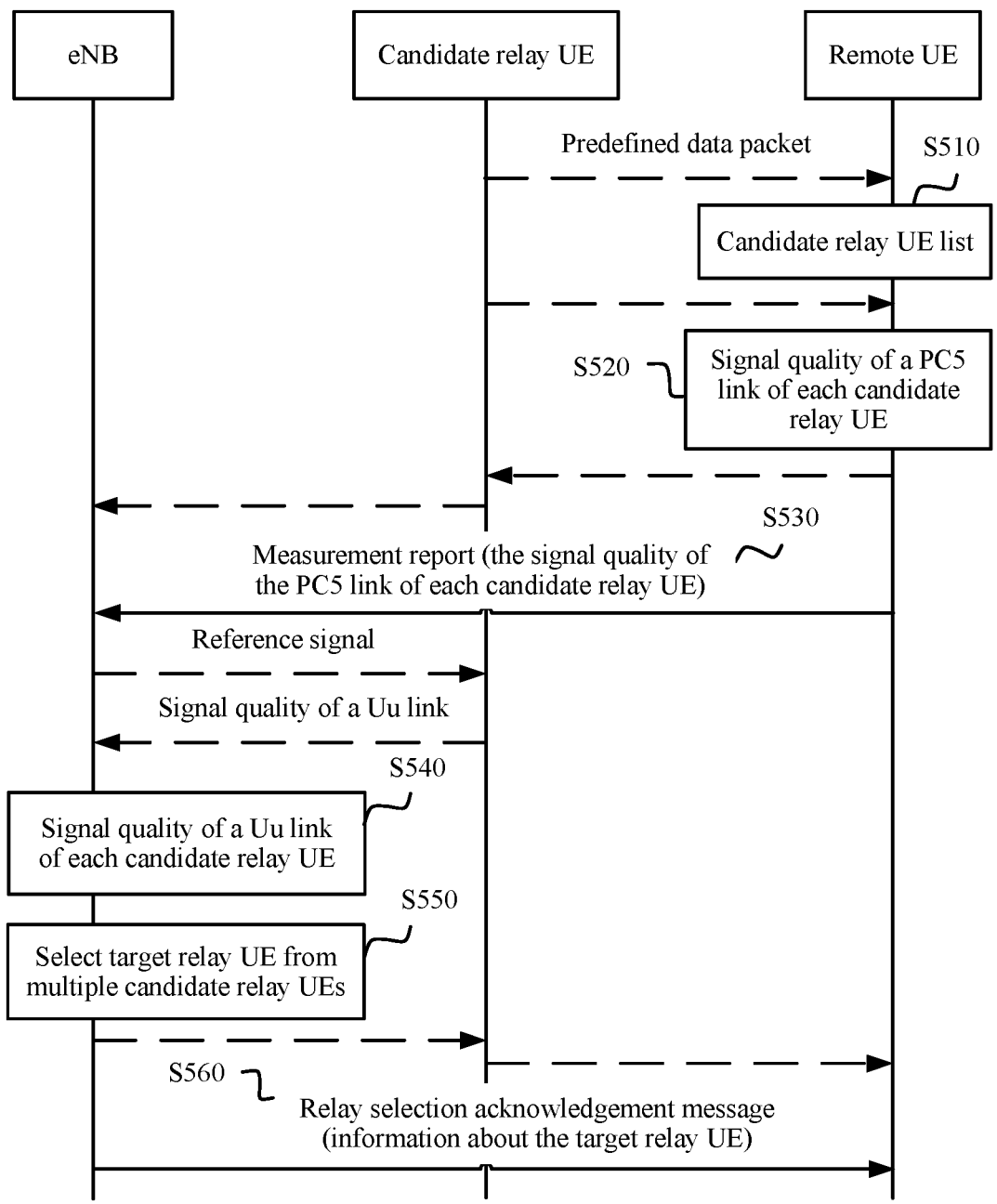
FIG. 7 shows a schematic flowchart of a method for selecting a relay in D2D communication according to another embodiment of the present invention.

FIG. 7 is a schematic flowchart of a method 500 for selecting a relay in D2D communication according to another embodiment of the present invention. The method 500 may be applied to initial relay selection or relay reselection. In the method 500, an eNB selects target relay UE.

S510. Remote UE determines a candidate relay UE list, where the candidate relay UE list includes at least one candidate relay UEs.

Optionally, the remote UE may receive indication information that is sent by the eNB and that is used to indicate the candidate relay UE list, and determine the candidate relay UE list according to the indication information.

In another optional embodiment, each UE that can serve as relay UE (for example, that has a corresponding capability and/or that is configured by the eNB) may send a predefined message, data packet, or sequence periodically or by means of event triggering, so that another UE can discover the UE and use the UE as candidate relay UE. Optionally, the predefined message or data packet may carry identification information of the UE that sends the predefined message or data packet, a DMRS used to demodulate the message, or other information. For ease of description, the following uses an example in which the UE sends the predefined data packet for description. However, this is not limited in this embodiment of the present invention.

The remote UE may detect a predefined data packet, so as to discover candidate relay UE. In this embodiment of the present invention, when detecting the predefined data packet sent by another UE, the remote UE may directly determine the another UE as candidate relay UE, and add the another UE to the candidate relay UE list. Optionally, in another embodiment, after detecting the predefined data packet sent by another UE, the remote UE may perform demodulation and check processing on the detected predefined data packet, to determine whether the predefined data packet is successfully received; and determine the another UE as candidate relay UE and perform subsequent signal measurement only when the remote UE determines that the predefined data packet is successfully received, that is, when the remote UE successfully demodulates and decodes the predefined data packet. If the remote UE does not successfully receive the predefined data packet sent by another UE, even though the remote UE detects the predefined data packet sent by the another UE, the remote UE does not use the another UE as candidate relay UE, so that subsequent workload can be reduced, and complexity of a process of selecting the target relay UE can be reduced.

S520. The remote UE determines signal quality of a PC5 link of each candidate relay UE in the candidate relay UE list.

Optionally, the remote UE may measure a D2D signal sent by each candidate relay UE in the candidate relay UE list on a second link (that is, the PC5 link) between each candidate relay UE and the remote UE, to obtain the signal quality of the PC5 link of each candidate relay UE, that is, obtain link quality of the PC5 link between each candidate relay UE and the remote UE. Alternatively, each candidate relay UE in the candidate relay UE list may measure a signal sent by the remote UE on the PC5 link between the remote UE and each candidate relay UE, to obtain the signal quality of the PC5 link of each candidate relay UE; and send the signal quality of the PC5 link of each candidate relay UE to the remote UE by using the PC5 link between each candidate relay UE and the remote UE. However, this is not limited in this embodiment of the present invention.

Optionally, the signal quality may be indicated by using at least one of the following parameters: RSRP, RSRQ, an RSSI, or a CQI, or may be indicated by using another parameter. This is not limited in this embodiment of the present invention. In addition, the D2D signal may include a synchronization signal, a DMRS, and/or another signal. This is not limited in this embodiment of the present invention.

S530. The remote UE sends a measurement report to the eNB, where the measurement report includes the signal quality that is of the PC5 link of each candidate relay UE in the candidate relay UE list and that is obtained in S520.

Specifically, the remote UE may actively send the measurement report to the eNB, or after receiving instruction information that is sent by the eNB and that is used to instruct the remote UE to send the measurement report, the remote UE determines to report and reports the signal quality of the PC5 link of each candidate relay UE in the candidate relay UE list to the eNB. This is not limited in this embodiment of the present invention.

Optionally, the remote UE may select temporary relay UE from the candidate relay UE list, and send the measurement report to the eNB with the assistance of the temporary relay UE. The remote UE may randomly select the temporary relay UE, or select the temporary relay UE according to the signal quality of the PC5 link of each candidate relay UE in the candidate relay UE list. For example, the remote UE determines, as the temporary relay UE, candidate relay UE that is in the at least one candidate relay UEs included in the candidate relay UE list and whose PC5 link has highest signal quality. However, this is not limited in this embodiment of the present invention.

Optionally, in another embodiment, if the remote UE falls within coverage of the eNB, the remote UE may directly send the measurement report to the eNB by using a cellular link between the remote UE and the eNB. This is not limited in this embodiment of the present invention.

S540. The eNB determines signal quality of a Uu link of each candidate relay UE in the candidate relay UE list.

Specifically, the eNB may pre-store the signal quality of the Uu link of each candidate relay UE. Alternatively, after receiving the measurement report sent by the remote UE, the eNB may measure a signal sent by each candidate relay UE in the candidate relay UE list on a first link (that is, the Uu link) between each candidate relay UE and the eNB, to obtain the signal quality of the Uu link of each candidate relay UE, that is, obtain link quality of the Uu link of each candidate relay UE. Alternatively, the eNB may instruct each candidate relay UE in the candidate relay UE list to report the signal quality of the Uu link of each candidate relay UE. Accordingly, each candidate relay UE in the candidate relay UE list may receive, according to an instruction of the eNB by using the Uu link between each candidate relay UE and the eNB, a signal sent by the eNB, measure the received signal, to obtain the signal quality of the Uu link of each candidate relay UE, and report the signal quality of the Uu link of each candidate relay UE to the eNB. However, this is not limited in this embodiment of the present invention.

In another optional embodiment, each candidate relay UE in the candidate relay UE list may report the signal quality of the PC5 link of each candidate relay UE to the eNB at the same time when each candidate relay UE reports the signal quality of the Uu link of each candidate relay UE to the eNB. In this way, the remote UE does not need to determine to report and report the signal quality of the PC5 link of each candidate relay UE in the candidate relay UE list to the eNB. However, this is not limited in this embodiment of the present invention.

S550. The eNB determines, according to the signal quality of the Uu link and the signal quality of the PC5 link of each candidate relay UE in the candidate relay UE list, the target relay UE from the at least one candidate relay UEs included in the candidate relay UE list.

Specifically, the eNB may determine the target relay UE according to a specific selection criterion. Optionally, the selection criterion may include at least one of the following conditions:

C1: Signal quality Ru of a Uu link is greater than a threshold Th1; or

C2: Signal quality Rp of a PC5 link is greater than a threshold Th2; or

C3: An absolute value of a difference between Ru and Rp (Rn=|Ru−Rp|) is less than a threshold Th3; or C4: Rs is the largest among all the candidate relay UEs, where Rs=Ru+Rp; or C5: Rn is the smallest among all the candidate relay UEs.

Th1 may be set according to a Uu link quality requirement, and Th2 may be set according to a PC5 link quality requirement. Specific values of Th1 and Th2 are not limited in this embodiment of the present invention.

In an optional example, the eNB may first determine candidate relay UE that meets the conditions C1 and C2 from the candidate relay UE list. If the candidate relay UE list includes only one candidate relay UE that meets both the conditions C1 and C2, the eNB may determine the candidate relay UE as the target relay UE. If the candidate relay UE list includes at least one candidate relay UEs that meet both the conditions C1 and C2, optionally, the eNB may further perform selection from the at least one candidate relay UEs according to at least one of the conditions C3 to C5. For example, if the eNB expects the link quality of the Uu link and the link quality of the PC5 link of the relay UE to keep basically balanced, the eNB may further select the target relay UE according to the at least one candidate relay UEs according to the condition C3 and/or the condition C5. If the eNB expects that a total transmission capability of the Uu link and the PC5 link of the relay UE is relatively high, the eNB may further select the target relay UE from the at least one candidate relay UEs according to the condition C4. However, this is not limited in this embodiment of the present invention.

Alternatively, the eNB may select the target relay UE according to another criterion. This is not limited in this embodiment of the present invention.

S560. The eNB sends a relay selection acknowledgement message to the remote UE, where the relay selection acknowledgement message carries information about the target relay UE.

The information about the target relay UE may include an equipment identifier, a user identifier, a random access radio network temporary identifier (Random Access Radio Network Temporary Identifier, RA_CNTI), an IP address, or the like of the target relay UE. This is not limited in this embodiment of the present invention. Optionally, the eNB may send the relay selection acknowledgement message to the remote UE by using the target relay UE. Alternatively, if the remote UE falls within the coverage of the eNB, the eNB may directly send the relay selection acknowledgement message to the remote UE by using the cellular link between the remote UE and the eNB. This is not limited in this embodiment of the present invention.

Therefore, according to the method for selecting a relay in D2D communication in this embodiment of the present invention, the eNB selects, according to the specific selection criterion and the signal quality of the Uu link and the signal quality of the PC5 link of each candidate relay UE in the candidate relay UE list, the target relay UE of the remote UE from the at least one candidate relay UEs included in the candidate relay UE list, so that suitable relay node UE can be selected for each remote UE. Further, the eNB selects the target relay UE for the remote UE, so that multiple different remote UEs can be prevented from selecting same UE as relay nodes. This also helps a network to allocate the candidate relay UEs to different remote UEs as relay nodes, so that transmission performance of the entire network can be balanced while relay transmission performance is ensured. In addition, the remote UE adds another UE to the candidate relay UE list only when determining that a signal sent by the another UE is successfully received, so that complexity of a subsequent process of selecting the target relay UE can be reduced.

Figure 8:
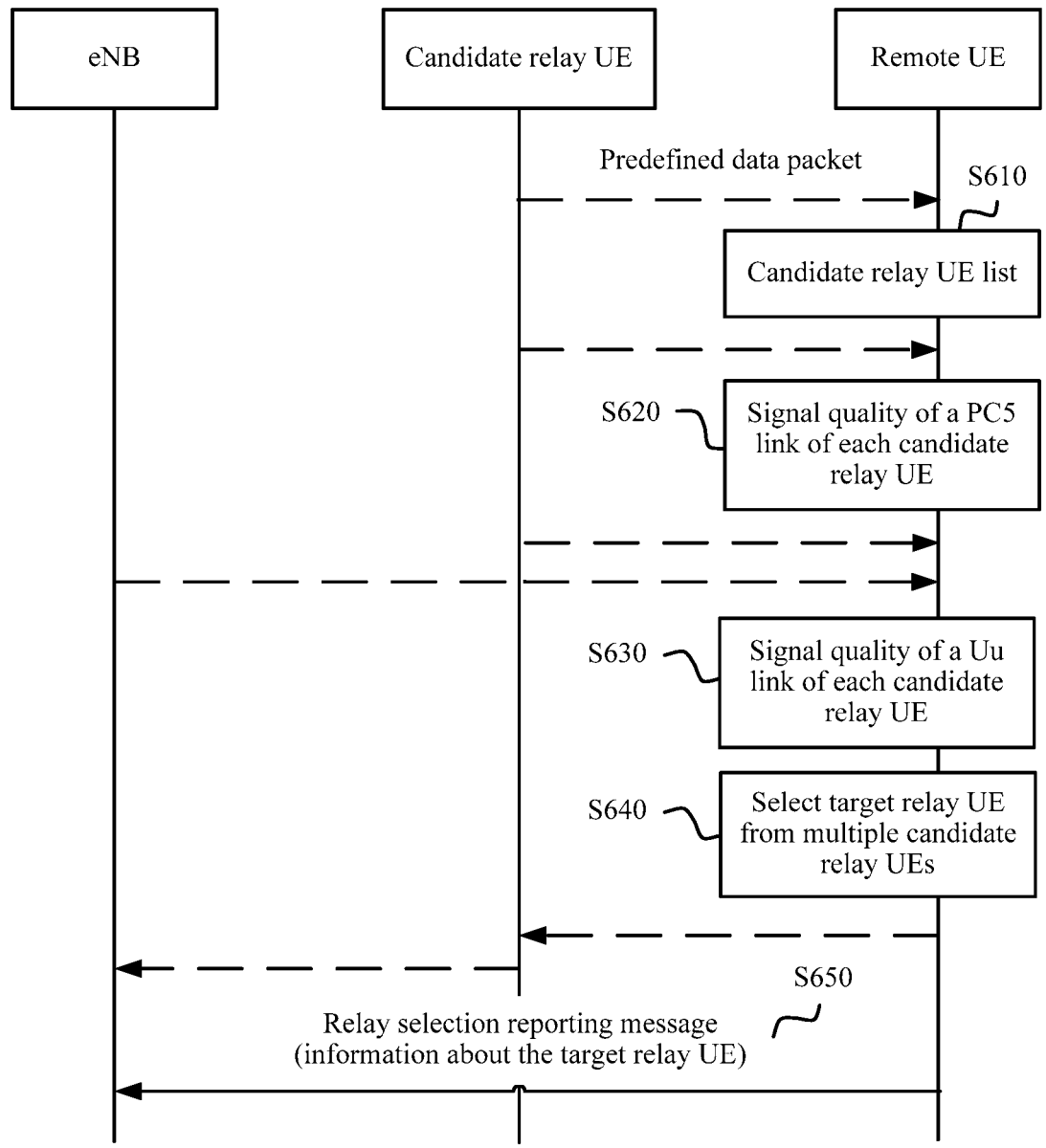
FIG. 8 shows a schematic flowchart of a method for selecting a relay in D2D communication according to another embodiment of the present invention.

FIG. 8 shows another method 600 for selecting a relay in D2D communication according to an embodiment of the present invention. The method 600 may be applied to initial relay selection or relay reselection. In the method 600, remote UE selects target relay UE.

S610 and S620 are respectively similar to S510 and S520 in the method 500. For brevity, details are not described herein again.

S630. The remote UE determines signal quality of a Uu link of each candidate relay UE in the candidate relay UE list. Specifically, the remote UE may receive indication information sent by an eNB directly or by using temporary relay UE. The indication information is used to indicate the signal quality of the Uu link of each candidate relay UE in the candidate relay UE list. Alternatively, the remote UE may receive indication information sent by each candidate relay UE in the candidate relay UE list by using the PC5 link between each candidate relay UE and the remote UE. The indication information is used to indicate the signal quality of the Uu link of each candidate relay UE. Each candidate relay UE in the candidate relay UE list may actively send the indication information or send the indication information according to an instruction of the remote UE or the eNB, and may add the signal quality of the Uu link and the signal quality of the PC5 link of each candidate relay UE to a same message or different messages for sending. This is not limited in this embodiment of the present invention. Optionally, information related to candidate relay UE may be determined and then indicated to the eNB or the remote UE by the candidate relay UE, or may be determined and then indicated to the candidate relay UE or the eNB by the remote UE. This is not limited herein.

S640. The remote UE determines, according to the signal quality of the Uu link and the signal quality of the PC5 link of each candidate relay UE in the candidate relay UE list, the target relay UE from the multiple candidate relay included in the candidate relay UE list.

For a criterion for selecting the target relay UE by the remote UE, refer to descriptions in S550. For brevity, details are not described herein again. The criterion and at least one of a threshold Th1, Th2, or Th3 may be indicated by the eNB or predefined. This is not limited in this embodiment of the present invention.

S650. The remote UE sends a relay selection reporting message to an eNB, where the relay selection reporting message carries information about the target relay UE.

Therefore, according to the method for selecting a relay in D2D communication in this embodiment of the present invention, the remote UE selects, according to the specific selection criterion and the signal quality of the Uu link and the signal quality of the PC5 link of each candidate relay UE in the candidate relay UE list, the target relay UE of the remote UE from the multiple candidate relay UEs included in the candidate relay UE list, so that a technical solution of using UE as a relay node can be more feasible, complexity and workload of identifying candidate relay UE by the eNB can be reduced, and efficiency of selecting the target relay UE can be increased. Further, the remote UE determines the target relay UE of the remote UE, so that a quantity of signaling sent to the eNB can be reduced, and the efficiency of selecting the relay UE can be increased. In addition, the remote UE adds another UE to the candidate relay UE list only when determining that a signal sent by the another UE is successfully received, so that complexity of a subsequent process of selecting the target relay UE can be reduced.

Figure 9:
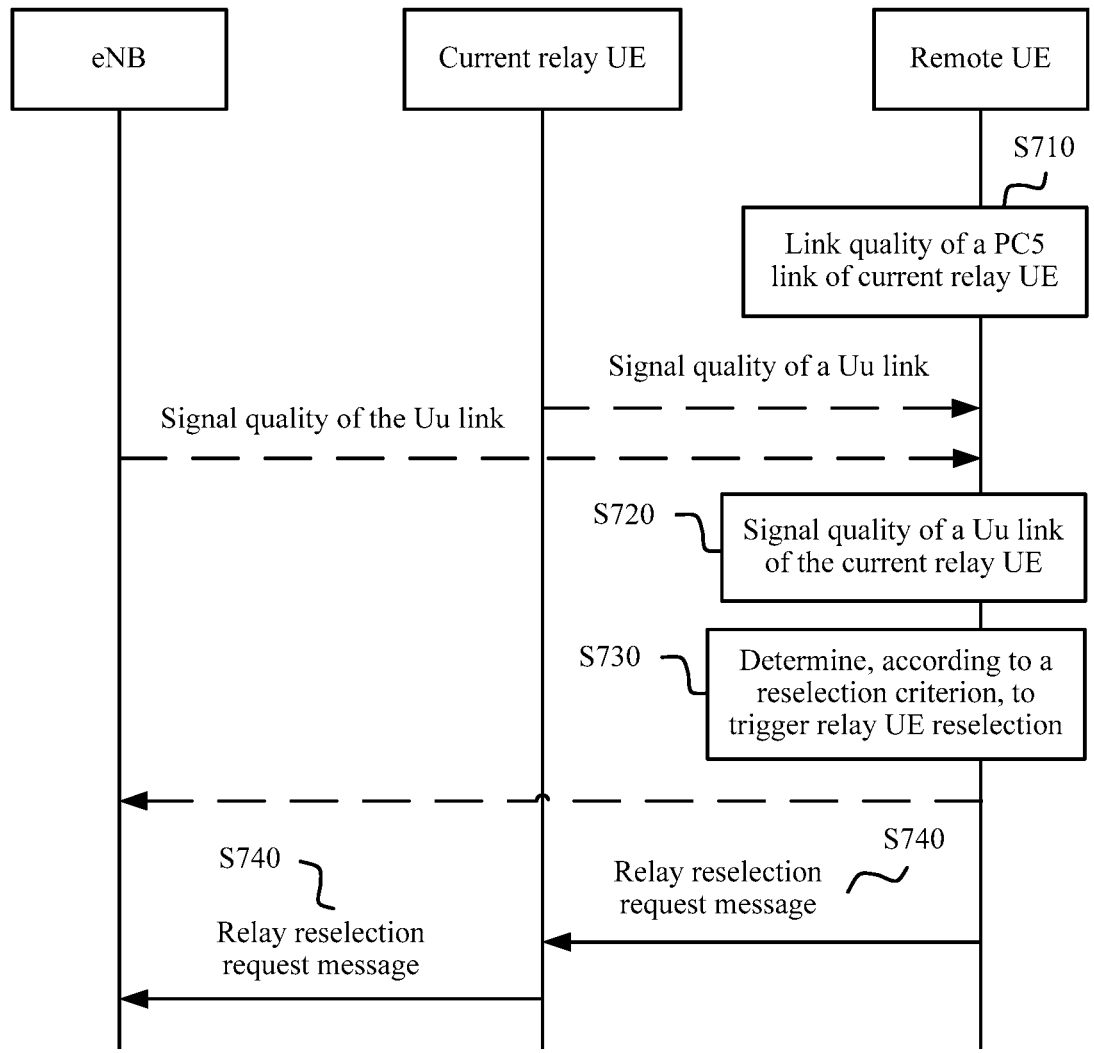
FIG. 9 shows a schematic flowchart of a method for selecting a relay in D2D communication according to another embodiment of the present invention.

FIG. 9 shows a reselection trigger mechanism 700 of relay UE according to an embodiment of the present invention. In the trigger mechanism 700, remote UE triggers relay UE reselection.

S710. The remote UE determines signal quality of a PC5 link of current relay UE.

Optionally, the remote UE may measure a signal sent by the current relay UE on the PC5 link between the current relay UE and the remote UE, to obtain link quality of the PC5 link between the current relay UE and the remote UE; or the remote UE may receive indication information that is sent by the remote UE and that is used to indicate link quality of the PC5 link. However, this is not limited in this embodiment of the present invention.

S720. The remote UE obtains signal quality of a Uu link of the current relay UE.

The remote UE may obtain link quality of the Uu link between the current relay UE and an eNB from indication information sent by the current relay UE to the remote UE. The link quality of the Uu link may be obtained by the current relay UE by measuring a signal sent by the eNB on the Uu link. Alternatively, the remote UE may obtain link quality of the Uu link between the current relay UE and an eNB from indication information sent to the remote UE by the eNB directly or by using the current relay UE. This is not limited in this embodiment of the present invention.

S730. The remote UE determines, according to the signal quality of the PC5 link and the signal quality of the Uu link of the current relay UE, whether to trigger relay UE reselection.

The remote UE may determine, according to a specific criterion, whether to trigger the relay UE reselection. The criterion may include at least one of the following conditions:

C6: The signal quality Ru of the Uu link is less than a threshold Th4; or

C7: The signal quality Rp of the PC5 link is less than a threshold Th5; or

C8: Rn=|Ru−Rp| is greater than a threshold Th6.

When the conditions C6 and C7 are met, it indicates that the signal quality of the current Uu link and the signal quality of the current PC5 link are relatively low, and this affects data transmission performance of an entire link. When the condition C8 is met, it indicates that a performance difference between the current Uu link and the current PC5 link is relatively large, and a link with relatively poor performance becomes a transmission bottleneck of the entire link, and consequently, transmission efficiency of the entire link is affected. Therefore, when at least one of the foregoing conditions is met, the relay UE reselection may be triggered.

The criterion or at least one of the threshold Th4, Th5, or Th6 may be indicated to the remote UE by the eNB by using indication information or predefined. This is not limited in this embodiment of the present invention.

When at least one of the conditions C6 to C8 is met, the remote UE may determine to reselect relay UE, that is, perform S740. However, this is not limited in this embodiment of the present invention.

Alternatively, the remote UE may determine, according to another criterion, whether to trigger the relay UE reselection. This is not limited in this embodiment of the present invention.

S740. The remote UE sends, to an eNB, a relay reselection request message directly or by using the current relay UE. The relay reselection request message may be used to request the eNB to reselect relay UE. Accordingly, after receiving the relay reselection request message, the eNB may execute the method 500 to reselect a relay. Alternatively, the relay reselection request message may be used to request the eNB to allow relay UE reselection. Accordingly, the eNB sends an acknowledgement message to the remote UE when determining to allow the remote UE to reselect relay UE, and the remote UE may execute the method 600 to reselect relay UE. Alternatively, the remote UE may not send the relay reselection request message to the eNB, but directly reselect relay UE. However, this is not limited in this embodiment of the present invention.

Figure 10:
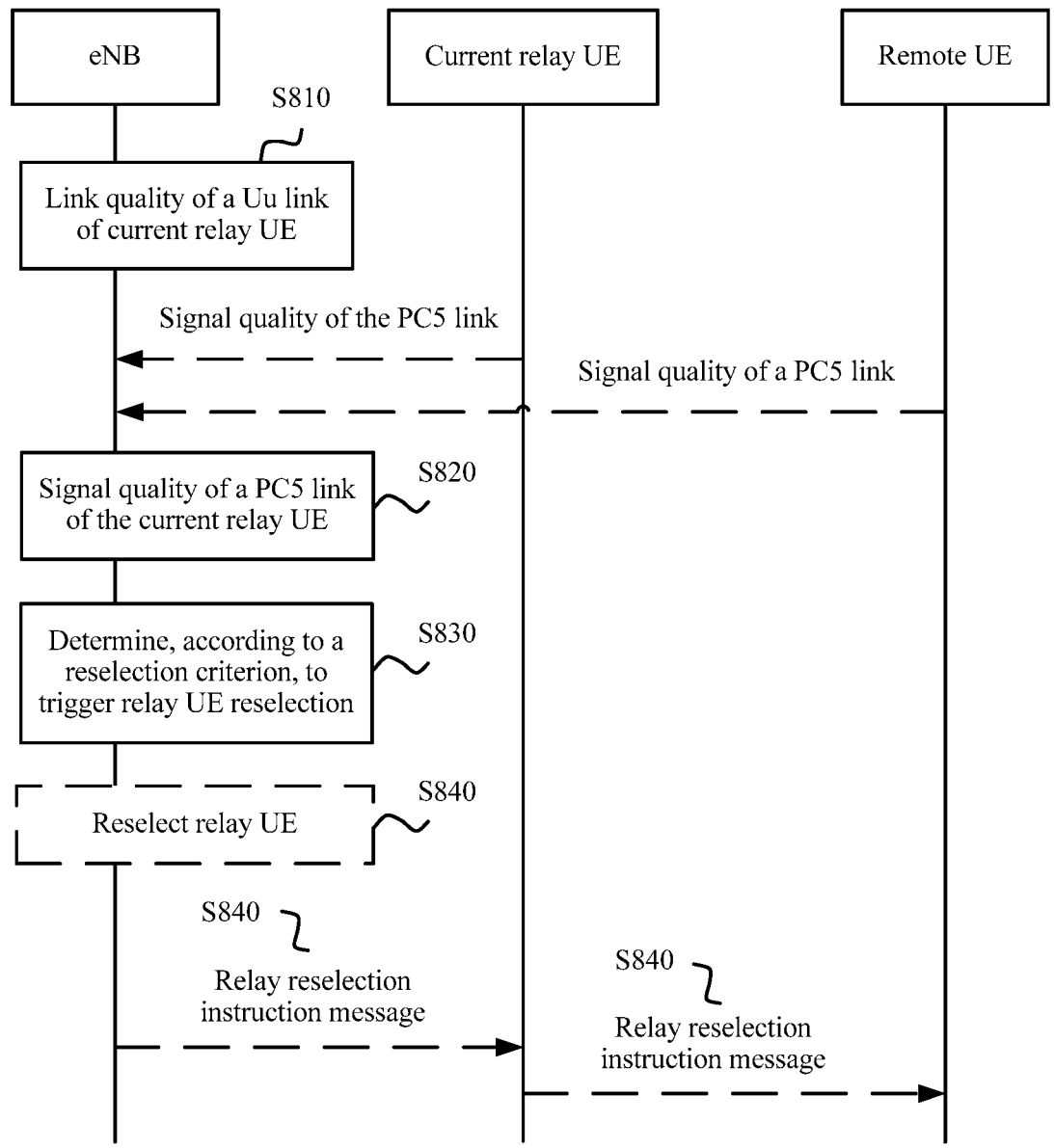
FIG. 10 shows a schematic flowchart of a method for selecting a relay in D2D communication according to another embodiment of the present invention.

FIG. 10 shows a reselection trigger mechanism 800 of relay UE according to an embodiment of the present invention. In the trigger mechanism 800, an eNB triggers relay UE reselection.

S810. The eNB determines signal quality of a Uu link of current relay UE.

The eNB may measure a signal sent by the current relay UE on the Uu link between the current relay UE and the eNB, to obtain link quality of the Uu link between the current relay UE and the eNB. Alternatively, the eNB may obtain link quality of the Uu link between the current relay UE and the eNB from a measurement report reported by the current relay UE to the eNB. The link quality of the Uu link may be obtained by the current relay UE by measuring a signal sent by the eNB on the Uu link. However, this is not limited in this embodiment of the present invention.

S820. The eNB determines signal quality of a PC5 link of the current relay UE.

Optionally, the eNB may obtain link quality of the PC5 link between the current relay UE and remote UE from a measurement report sent by the remote UE. The link quality of the PC5 link is obtained by the current relay UE by measuring a signal sent by the remote UE on the PC5 link between the remote UE and the current relay UE. The remote UE may send the measurement report to the eNB actively or according to an instruction of the eNB. Alternatively, the eNB may obtain link quality of the PC5 link between the current relay UE and the remote UE from a measurement report sent to the eNB by the remote UE directly or by using the current relay UE. However, this is not limited in this embodiment of the present invention.

S830. The eNB determines, according to the signal quality of the PC5 link and the signal quality of the Uu link of the current relay UE, whether to trigger relay UE reselection.

The eNB may determine, according to a specific criterion, whether to trigger the relay UE reselection, and perform S840 when determining to reselect relay UE. The criterion may be similar to that in descriptions in S730. However, this is not limited in this embodiment of the present invention.

S840. The eNB may execute the method 500 to reselect a relay; or the eNB sends a relay reselection instruction message to remote UE directly or by using the current relay UE, and after receiving the relay reselection instruction message, the remote UE may execute the method 600 to reselect a relay. However, this is not limited in this embodiment of the present invention.

Figure 11:
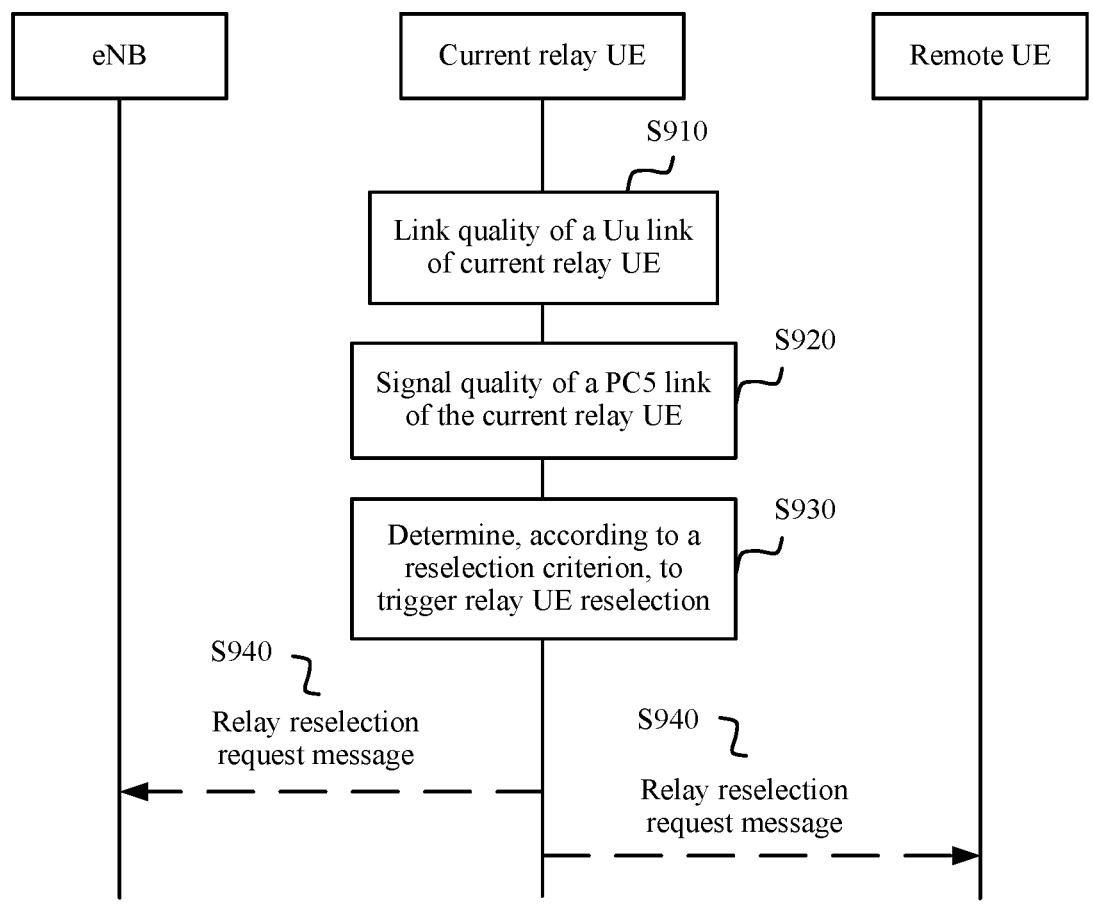
FIG. 11 shows a schematic flowchart of a method for selecting a relay in D2D communication according to another embodiment of the present invention.

FIG. 11 shows a reselection trigger mechanism 900 of relay UE according to an embodiment of the present invention. In the trigger mechanism 900, current relay UE triggers relay UE reselection.

S910. The current relay UE determines signal quality of a Uu link between the current relay UE and an eNB.

The current relay UE may measure a signal sent by the eNB on the Uu link between the eNB and the current relay UE, to obtain link quality of the Uu link between the current relay UE and the eNB. However, this is not limited in this embodiment of the present invention.

S920. The current relay UE determines signal quality of a PC5 link between the current relay UE and remote UE.

The current relay UE may measure a signal sent by the remote UE on the PC5 link between the remote UE and the current relay UE, to obtain link quality of the PC5 link between the current relay UE and the remote UE. However, this is not limited in this embodiment of the present invention.

S930. The current relay UE determines, according to the signal quality of the PC5 link and the signal quality of the Uu link, whether to trigger relay UE reselection.

The current relay UE may determine, according to a specific criterion, whether to trigger the relay UE reselection, and perform S940 when determining that relay UE is to be reselected. The criterion may be similar to that in descriptions in S730. However, this is not limited in this embodiment of the present invention.

S940. The current relay UE may send a relay reselection request message to the eNB, to request the eNB to reselect relay UE, and accordingly, after receiving the relay reselection request message, the eNB may execute the method 500 to reselect a relay; or the current relay UE may send a relay reselection request message to the remote UE, to request the remote UE to reselect a relay, and accordingly, after receiving the relay reselection request message, the remote UE may execute the method 600 to reselect a relay.

It should be noted that, the examples in FIG. 7 to FIG. 11 are merely intended to help a person skilled in the art better understand the embodiments of the present invention, but are not intended to limit the scope of the embodiments of the present invention. A person skilled in the art certainly can make various equivalent modifications or changes according to the examples provided in FIG. 7 to FIG. 11, and such modifications or changes also fall within the scope of the embodiments of the present invention.

It should be understood that sequence numbers of the foregoing processes do not mean execution sequences. Execution sequences of the processes should be determined according to functions and internal logic of the processes, and shall not constitute any limitation on implementation processes of the embodiments of the present invention.

It should also be understood that the foregoing emphasizes differences between the method embodiments. For a part that is not mentioned in an embodiment, refer to other embodiments. For brevity, details are not described repeatedly in this specification.

The foregoing describes in detail the method for selecting a relay in D2D communication according to the embodiments of the present invention with reference to FIG. 1 to FIG. 11. The following describes an apparatus for selecting a relay in D2D communication according to the embodiments of the present invention with reference to FIG. 12 to FIG. 17.

Figure 12:
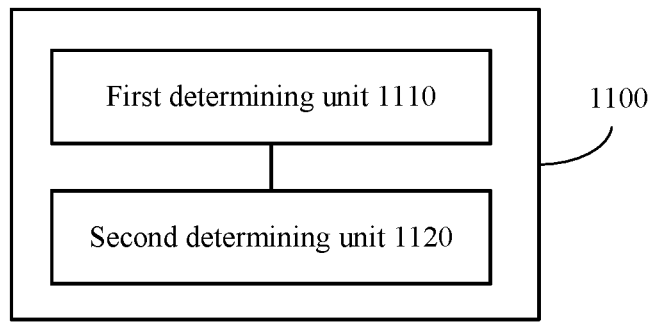
FIG. 12 shows a schematic block diagram of an apparatus for selecting a relay in D2D communication according to an embodiment of the present invention.

FIG. 12 shows an apparatus 1100 for selecting a relay in D2D communication according to an embodiment of the present invention. The apparatus 1100 includes:

a first determining unit 1110, configured to determine link quality of a first link of each candidate relay UE in a candidate relay UE list, where the candidate relay UE list includes at least one candidate relay UE, and the first link of each candidate relay UE is a radio link between each candidate relay UE and a base station; and a second determining unit 1120, configured to determine target relay UE from the candidate relay UE list according to the link quality that is of the first link of each candidate relay UE in the candidate relay UE list and that is determined by the first determining unit 1110, where the target relay UE is used for relaying data between first UE and the base station.

Therefore, according to the apparatus for selecting a relay in D2D communication in this embodiment of the present invention, a relay selection device selects, according to a specific selection criterion and the link quality of the radio link between each candidate relay UE in the candidate relay UE list and the base station, the target relay UE of the first UE from at least one candidate relay UEs included in the candidate relay UE list, so that suitable relay UE can be selected for the first UE. Therefore, overall system performance is improved.

In an optional embodiment, the first determining unit 1110 is further configured to: before the second determining unit 1120 determines the target relay UE from the candidate relay UE list, determine link quality of a second link of each candidate relay UE in the candidate relay UE list, where the second link of each candidate relay UE is a radio link between each candidate relay UE and the first UE.

The second determining unit 1120 is specifically configured to determine the target relay UE from the candidate relay UE list according to the link quality of the first link and the link quality of the second link of each candidate relay UE in the candidate relay UE list that are determined by the first determining unit 1110.

In an optional embodiment, the second determining unit 1120 is specifically configured to determine first candidate relay UE in the candidate relay UE list as the target relay UE, where link quality of a first link of the first candidate relay UE is greater than a first threshold, and link quality of a second link of the first candidate relay UE is greater than a second threshold.

In another optional embodiment, the first candidate relay UE further meets at least one of the following conditions:
  an absolute value of a difference between the link quality of the first link of the first candidate relay UE and the link quality of the second link of the first candidate relay UE is less than a third threshold; or
  the first candidate relay UE is candidate relay UE with a largest link quality sum in the candidate relay UE list, where a link quality sum of each candidate relay UE is equal to a sum of the link quality of the first link of each candidate relay UE and the link quality of the second link of each candidate relay UE; or
  the first candidate relay UE is candidate relay UE with a smallest link quality difference in the candidate relay UE list, where a link quality difference of each candidate relay UE is equal to an absolute value of a difference between the link quality of the first link of each candidate relay UE and the link quality of the second link of each candidate relay UE.

In an optional embodiment, the apparatus 1100 is the base station. In this case, the apparatus 1100 further includes a first receiving unit, configured to receive first indication information sent by the first UE, where the first indication information is used to indicate the link quality of the second link of each candidate relay UE in the candidate relay UE list.

Accordingly, the first determining unit 1110 is specifically configured to determine the link quality of the second link of each candidate relay UE in the candidate relay UE list according to the first indication information received by the first receiving unit.

The apparatus 1100 further includes a sending unit, configured to send second indication information to the first UE after the second determining unit 1120 determines the target relay UE from the candidate relay UE list, where the second indication information is used to indicate the target relay UE.

In another optional embodiment, the first receiving unit is specifically configured to:
  receive the first indication information sent by the first UE by using temporary relay UE in the candidate relay UE list, where the temporary relay UE is determined by the first UE according to the link quality of the second link of each candidate relay UE in the candidate relay UE list; or
  receive the first indication information directly sent by the first UE by using a cellular link between the first UE and the base station.

In another optional embodiment, the apparatus 1100 is the first UE. In this case, optionally, the first determining unit 1110 is specifically configured to measure a signal sent by each candidate relay UE in the candidate relay UE list, to obtain the link quality of the second link of each candidate relay UE.

In an optional embodiment, the first determining unit 1110 is specifically configured to perform at least one of the following operations:
  measuring a DMRS included in a data packet sent by second candidate relay UE in the candidate relay UE list; or
  performing demodulation and decoding processing on a signal sent by third candidate relay UE in the candidate relay UE list, and when the signal is successfully decoded, reconstructing the signal, and measuring the reconstructed signal.

In another optional embodiment, the apparatus 1100 further includes:
  a second receiving unit, configured to: before the first determining unit 1110 determines the link quality of the first link of each candidate relay UE in the candidate relay UE list, receive information sent by second UE, where the information is used to indicate that the second UE can serve as relay UE.

The first determining unit 1110 is further configured to add the second UE to the candidate relay UE list if the second receiving unit successfully receives the information sent by the second UE.

In an optional embodiment, the second UE sends the information to the first UE when determining that link quality of a wireless cellular link between the base station and the second UE is greater than a quality threshold, where the quality threshold is configured by the base station, or the quality threshold is indicated by the first UE by using indication information, or the quality threshold is predefined.

In another optional embodiment, the first determining unit 1110 is further configured to: before determining the link quality of the first link of each candidate relay UE in the candidate relay UE list, determine to reselect relay UE.

In an optional embodiment, the apparatus 1100 further includes:
  a third receiving unit, configured to receive a relay reselection request sent by current relay UE of the first UE.

The first determining unit 1110 is specifically configured to determine, according to the relay reselection request received by the third receiving unit, to reselect relay UE.

In another optional embodiment, the first determining unit 1110 is specifically configured to:
  determine current link quality of at least one of a first link or a second link of current relay UE, where the first link of the current relay UE is a radio link between the base station and the current relay UE, and the second link of the current relay UE is a radio link between the first UE and the current relay UE; and if the current link quality of the at least one of the first link or the second link of the current relay UE meets a relay reselection trigger condition, determine to reselect relay UE, where the relay reselection trigger condition includes at least one of the following conditions: current link quality of the first link of the current relay UE is less than a fourth threshold, or current link quality of the second link of the current relay UE is less than a fifth threshold, or an absolute value of a difference between current link quality of the first link of the current relay UE and current link quality of the second link of the current relay UE is greater than a sixth threshold.

The apparatus 1100 according to this embodiment of the present invention may be corresponding to the relay selection device in the method for selecting a relay in D2D communication according to the embodiments of the present invention, and the foregoing and other operations and/or functions of modules in the apparatus 1100 are separately used to implement corresponding procedures of the methods in FIG. 2 to FIG. 11. For brevity, details are not described herein again.

Therefore, according to the apparatus for selecting a relay in D2D communication in this embodiment of the present invention, the relay selection device selects, according to the specific selection criterion and the link quality of the radio link between each candidate relay UE in the candidate relay UE list and the base station, the target relay UE of the first UE from the at least one candidate relay UEs included in the candidate relay UE list, so that suitable relay UE can be selected for the first UE. Therefore, overall system performance is improved.

Figure 13:
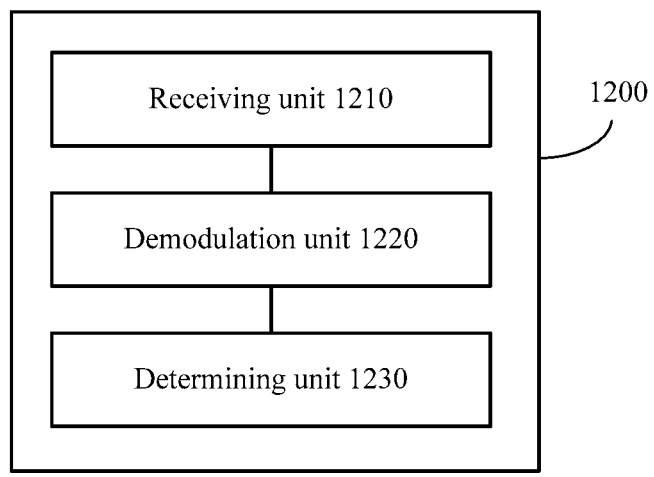
FIG. 13 shows a schematic block diagram of an apparatus for selecting a relay in D2D communication according to another embodiment of the present invention.

FIG. 13 shows an apparatus 1200 for selecting a relay in D2D communication according to another embodiment of the present invention. The apparatus 1200 includes:

a receiving unit 1210, configured to receive information sent by second UE, where the information is used to indicate that the second UE can serve as relay UE;

a demodulation unit 1220, configured to perform demodulation processing on the information that is sent by the second UE and that is received by the receiving unit 1210, to determine whether the information sent by the second UE is successfully received; and a determining unit 1230, configured to add the second UE to a candidate relay UE list if the demodulation unit 1220 determines that the information sent by the second UE is successfully received.

In an optional embodiment, the second UE sends the information to the apparatus 1200 when determining that link quality of a wireless cellular link between the base station and the second UE is greater than a quality threshold, where the quality threshold is configured by the base station, or the quality threshold is indicated by the apparatus 1200 by using indication information, or the quality threshold is predefined.

In another optional embodiment, the apparatus 1200 further includes a measurement unit, configured to measure a signal sent by each candidate relay UE in the candidate relay UE list, to obtain link quality of a radio link between each candidate relay UE and the apparatus 1200.

Accordingly, the determining unit 1230 is further configured to determine target relay UE from the candidate relay UE list according to the link quality that is of the radio link between each candidate relay UE in the candidate relay UE list and the apparatus 1200 and that is obtained by the measurement unit, where the target relay UE is used for relaying data transmitted between the apparatus 1200 and the base station.

In another optional embodiment, the measurement unit is specifically configured to perform at least one of the following operations:

measuring a demodulation reference signal DMRS included in a data packet sent by second candidate relay UE in the candidate relay UE list; or performing demodulation and decoding processing on a signal sent by third candidate relay UE in the candidate relay UE list, and when the signal is successfully decoded, reconstructing the signal, and measuring the reconstructed signal.

In another optional embodiment, the apparatus 1200 further includes a sending unit, configured to send first indication information to the base station, where the first indication information is used to indicate the link quality of the radio link between each candidate relay UE in the candidate relay UE list and the apparatus 1200.

Accordingly, the receiving unit 1210 is further configured to receive second indication information sent by the base station according to the first indication information sent by the sending unit, where the second indication information is used to indicate the target relay UE.

The determining unit 1230 is specifically configured to determine the target relay UE according to the second indication information received by the receiving unit 1210.

The apparatus 1200 according to this embodiment of the present invention may be corresponding to the first UE in the method for selecting a relay in D2D communication according to the embodiments of the present invention, and the foregoing and other operations and/or functions of modules in the apparatus 1200 are separately used to implement corresponding procedures of the methods in FIG. 2 to FIG. 11. For brevity, details are not described herein again.

Therefore, when receiving the information sent by the second UE, the apparatus for selecting a relay in D2D communication according to this embodiment of the present invention determines whether the information sent by the second UE is successfully received, and determines the second UE as candidate relay UE only when determining that the information sent by the second UE is successfully received, so that workload and complexity of a subsequent process can be prevented from increasing because unsuitable UE is added to the candidate relay UE list.

Figure 14:
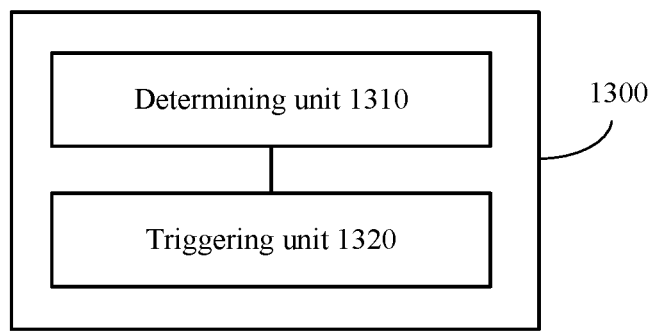
FIG. 14 shows a schematic block diagram of an apparatus for selecting a relay in D2D communication according to another embodiment of the present invention.

FIG. 14 shows an apparatus 1300 for selecting a relay in D2D communication according to another embodiment of the present invention. The apparatus 1300 includes:

a determining unit 1310, configured to determine current link quality of at least one of a first link or a second link, where the first link is a radio link between a base station and current relay UE, and the second link is a radio link between first UE and the current relay UE; and a triggering unit 1320, configured to trigger relay UE reselection if the determining unit 1310 determines that the current link quality of the at least one of the first link or the second link meets a relay reselection trigger condition, where the relay reselection trigger condition includes at least one of the following conditions: current link quality of the first link is less than a fourth threshold, or current link quality of the second link is less than a fifth threshold, or an absolute value of a difference between current link quality of the first link and current link quality of the second link is greater than a sixth threshold.

In an optional embodiment, the apparatus 1300 is the current relay UE. In this case, the triggering unit 1320 is specifically configured to send a relay reselection request to the first UE or the base station.

In another optional embodiment, the apparatus 1300 is the first UE or the base station.

The apparatus 1300 according to this embodiment of the present invention may be corresponding to the relay reselection triggering device in the method for selecting a relay in D2D communication according to the embodiments of the present invention, and the foregoing and other operations and/or functions of modules in the apparatus 1300 are separately used to implement corresponding procedures of the methods in FIG. 2 to FIG. 11. For brevity, details are not described herein again.

Therefore, the apparatus for selecting a relay UE according to this embodiment of the present invention triggers the relay UE reselection when determining that the current link quality of the first link and/or the current link quality of the second link of the current relay UE meet/meets the relay reselection trigger condition, so that communication between the first UE and the base station can be prevented from being affected because the current link quality of the first link and/or the current link quality of the second link of the current relay UE are/is relatively low. Therefore, overall system performance is improved, and user experience is enhanced.

Figure 15:
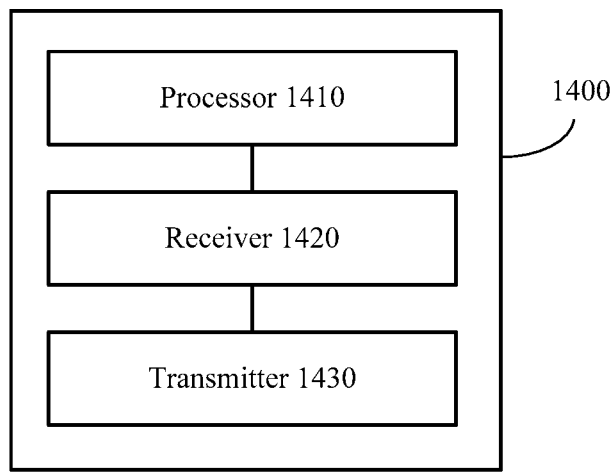
FIG. 15 shows a schematic block diagram of an apparatus for selecting a relay in D2D communication according to another embodiment of the present invention.

FIG. 15 shows an apparatus 1400 for selecting a relay in D2D communication according to an embodiment of the present invention. The apparatus 1400 includes a processor 1410, configured to:
  determine link quality of a first link of each candidate relay UE in a candidate relay UE list, where the candidate relay UE list includes at least one candidate relay UE, and the first link of each candidate relay UE is a radio link between each candidate relay UE and a base station; and
  determine target relay UE from the candidate relay UE list according to the link quality of the first link of each candidate relay UE in the candidate relay UE list, where the target relay UE is used for relaying data between first UE and the base station.

Therefore, according to the apparatus for selecting a relay in D2D communication in this embodiment of the present invention, a relay selection device selects, according to a specific selection criterion and the link quality of the radio link between each candidate relay UE in the candidate relay UE list and the base station, the target relay UE of the first UE at least one candidate relay UEs included in the candidate relay UE list, so that suitable relay UE can be selected for the first UE. Therefore, overall system performance is improved.

In an optional embodiment, the processor 1410 is further configured to: before determining the target relay UE from the candidate relay UE list, determine link quality of a second link of each candidate relay UE in the candidate relay UE list, where the second link of each candidate relay UE is a radio link between each candidate relay UE and the first UE.

Accordingly, the processor 1410 is specifically configured to determine the target relay UE from the candidate relay UE list according to the link quality of the first link and the link quality of the second link of each candidate relay UE in the candidate relay UE list.

In an optional embodiment, the processor 1410 is specifically configured to determine first candidate relay UE in the candidate relay UE list as the target relay UE, where link quality of a first link of the first candidate relay UE is greater than a first threshold, and link quality of a second link of the first candidate relay UE is greater than a second threshold.

In another optional embodiment, the first candidate relay UE further meets at least one of the following conditions:
  an absolute value of a difference between the link quality of the first link of the first candidate relay UE and the link quality of the second link of the first candidate relay UE is less than a third threshold; or
  the first candidate relay UE is candidate relay UE with a largest link quality sum in the candidate relay UE list, where a link quality sum of each candidate relay UE is equal to a sum of the link quality of the first link of each candidate relay UE and the link quality of the second link of each candidate relay UE; or
  the first candidate relay UE is candidate relay UE with a smallest link quality difference in the candidate relay UE list, where a link quality difference of each candidate relay UE is equal to an absolute value of a difference between the link quality of the first link of each candidate relay UE and the link quality of the second link of each candidate relay UE.

In an optional embodiment, the apparatus 1400 is the base station. In this case, as shown in FIG. 15, the apparatus 1400 further includes a receiver 1420, configured to receive first indication information sent by the first UE, where the first indication information is used to indicate the link quality of the second link of each candidate relay UE in the candidate relay UE list.

Accordingly, the processor 1410 is specifically configured to determine the link quality of the second link of each candidate relay UE in the candidate relay UE list according to the first indication information received by the receiver 1420.

The apparatus 1400 further includes a transmitter 1430, configured to send second indication information to the first UE after the processor 1410 determines the target relay UE from the candidate relay UE list, where the second indication information is used to indicate the target relay UE.

In another optional embodiment, the receiver 1420 is specifically configured to:
  receive the first indication information sent by the first UE by using temporary relay UE in the candidate relay UE list, where the temporary relay UE is determined by the first UE according to the link quality of the second link of each candidate relay UE in the candidate relay UE list; or
  receive the first indication information directly sent by the first UE by using a cellular link between the first UE and the base station.

In another optional embodiment, the apparatus 1400 is the first UE. In this case, optionally, the processor 1410 is specifically configured to measure a signal sent by each candidate relay UE in the candidate relay UE list, to obtain the link quality of the second link of each candidate relay UE.

In an optional embodiment, the processor 1410 is specifically configured to perform at least one of the following operations:
  measuring a DMRS included in a data packet sent by second candidate relay UE in the candidate relay UE list; or
  performing demodulation and decoding processing on a signal sent by third candidate relay UE in the candidate relay UE list, and when the signal is successfully decoded, reconstructing the signal, and measuring the reconstructed signal.

In another optional embodiment, the apparatus 1400 further includes:

the receiver 1420, configured to: before the processor 1410 determines the link quality of the first link of each candidate relay UE in the candidate relay UE list, receive information sent by second UE, where the information is used to indicate that the second UE can serve as relay UE.

The processor 1410 is further configured to add the second UE to the candidate relay UE list if the receiver 1420 successfully receives the information sent by the second UE.

In an optional embodiment, the second UE sends the information to the first UE when determining that link quality of a wireless cellular link between the base station and the second UE is greater than a quality threshold, where the quality threshold is configured by the base station, or the quality threshold is indicated by the first UE by using indication information, or the quality threshold is predefined.

In another optional embodiment, the processor 1410 is further configured to: before determining the link quality of the first link of each candidate relay UE in the candidate relay UE list, determine to reselect relay UE.

In an optional embodiment, the apparatus 1400 further includes:

the receiver 1420, configured to receive a relay reselection request sent by current relay UE of the first UE.

The processor 1410 is specifically configured to determine, according to the relay reselection request received by the receiver 1420, to reselect relay UE.

In another optional embodiment, the processor 1410 is specifically configured to:

determine current link quality of at least one of a first link or a second link of current relay UE, where the first link of the current relay UE is a radio link between the base station and the current relay UE, and the second link of the current relay UE is a radio link between the first UE and the current relay UE; and if the current link quality of the at least one of the first link or the second link of the current relay UE meets a relay reselection trigger condition, determine to reselect relay UE, where the relay reselection trigger condition includes at least one of the following conditions: current link quality of the first link of the current relay UE is less than a fourth threshold, or current link quality of the second link of the current relay UE is less than a fifth threshold, or an absolute value of a difference between current link quality of the first link of the current relay UE and current link quality of the second link of the current relay UE is greater than a sixth threshold.

The apparatus 1400 according to this embodiment of the present invention may be corresponding to the relay selection device in the method for selecting a relay in D2D communication according to the embodiments of the present invention, and the foregoing and other operations and/or functions of modules in the apparatus 1400 are separately used to implement corresponding procedures of the methods in FIG. 2 to FIG. 11. For brevity, details are not described herein again.

Therefore, according to the apparatus for selecting a relay in D2D communication in this embodiment of the present invention, the relay selection device selects, according to the specific selection criterion and the link quality of the radio link between each candidate relay UE in the candidate relay UE list and the base station, the target relay UE of the first UE from the at least one candidate relay UEs included in the candidate relay UE list, so that suitable relay UE can be selected for the first UE. Therefore, overall system performance is improved.

Figure 16:
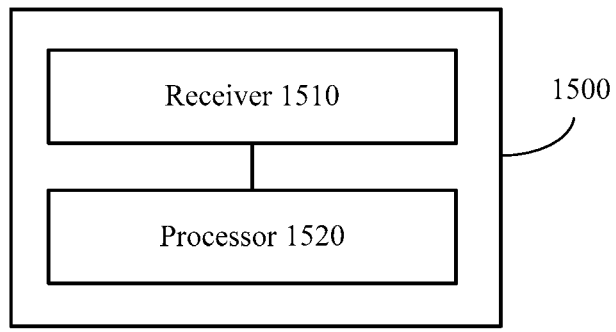
FIG. 16 shows a schematic block diagram of an apparatus for selecting a relay in D2D communication according to another embodiment of the present invention.

FIG. 16 shows an apparatus 1500 for selecting a relay in D2D communication according to another embodiment of the present invention. The apparatus 1500 includes:

a receiver 1510, configured to receive information sent by second UE, where the information is used to indicate that the second UE can serve as relay UE; and a processor 1520, configured to: perform demodulation processing on the information that is sent by the second UE and that is received by the receiver 1510, to determine whether the information sent by the second UE is successfully received; and add the second UE to a candidate relay UE list if the processor 1520 determines that the information sent by the second UE is successfully received.

In an optional embodiment, the second UE sends the information to the apparatus 1500 when determining that link quality of a wireless cellular link between the base station and the second UE is greater than a quality threshold, where the quality threshold is configured by the base station, or the quality threshold is indicated by the apparatus 1500 by using indication information, or the quality threshold is predefined.

In another optional embodiment, the processor 1520 is further configured to: measure a signal sent by each candidate relay UE in the candidate relay UE list, to obtain link quality of a radio link between each candidate relay UE and the apparatus 1500; and determine target relay UE from the candidate relay UE list according to the link quality of the radio link between each candidate relay UE in the candidate relay UE list and the apparatus 1500, where the target relay UE is used for relaying data transmitted between the apparatus 1500 and the base station.

In another optional embodiment, the processor 1520 is specifically configured to perform at least one of the following operations:

measuring a demodulation reference signal DMRS included in a data packet sent by second candidate relay UE in the candidate relay UE list; or performing demodulation and decoding processing on a signal sent by third candidate relay UE in the candidate relay UE list, and when the signal is successfully decoded, reconstructing the signal, and measuring the reconstructed signal.

In another optional embodiment, the apparatus 1500 further includes a transmitter, configured to send first indication information to the base station, where the first indication information is used to indicate the link quality of the radio link between each candidate relay UE in the candidate relay UE list and the apparatus 1500.

Accordingly, the receiver 1510 is further configured to receive second indication information sent by the base station according to the first indication information sent by the transmitter, where the second indication information is used to indicate the target relay UE.

The processor 1520 is specifically configured to determine the target relay UE according to the second indication information received by the receiver 1510.

The apparatus 1500 according to this embodiment of the present invention may be corresponding to the first UE in the method for selecting a relay in D2D communication according to the embodiments of the present invention, and the foregoing and other operations and/or functions of modules in the apparatus 1500 are separately used to implement corresponding procedures of the methods in FIG. 2 to FIG. 11. For brevity, details are not described herein again.

Therefore, when receiving the information sent by the second UE, the apparatus for selecting a relay in D2D communication according to this embodiment of the present invention determines whether the information sent by the second UE is successfully received, and determines the second UE as candidate relay UE only when determining that the information sent by the second UE is successfully received, so that workload and complexity of a subsequent process can be prevented from increasing because unsuitable UE is added to the candidate relay UE list.

Figure 17:
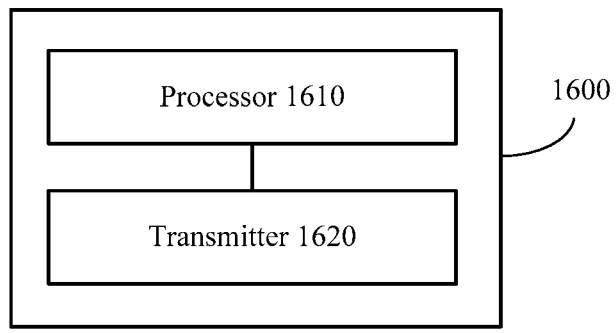
FIG. 17 shows a schematic block diagram of an apparatus for selecting a relay in D2D communication according to another embodiment of the present invention.

FIG. 17 shows an apparatus 1600 for selecting a relay in D2D communication according to another embodiment of the present invention. The apparatus 1600 includes a processor 1610, configured to:

determine current link quality of at least one of a first link or a second link, where the first link is a radio link between a base station and current relay UE, and the second link is a radio link between first UE and the current relay UE; and trigger relay UE reselection if the current link quality of the at least one of the first link or the second link meets a relay reselection trigger condition, where the relay reselection trigger condition includes at least one of the following conditions: current link quality of the first link is less than a fourth threshold, or current link quality of the second link is less than a fifth threshold, or an absolute value of a difference between current link quality of the first link and current link quality of the second link is greater than a sixth threshold.

In an optional embodiment, the apparatus 1600 is the current relay UE. In this case, the apparatus 1600 further includes a transmitter 1620. The processor 1610 specifically sends a relay reselection request to the first UE or the base station by using the transmitter 1620.

In another optional embodiment, the apparatus 1600 is the first UE or the base station.

The apparatus 1600 according to this embodiment of the present invention may be corresponding to the relay reselection triggering device in the method for selecting a relay in D2D communication according to the embodiments of the present invention, and the foregoing and other operations and/or functions of modules in the apparatus 1600 are separately used to implement corresponding procedures of the methods in FIG. 2 to FIG. 11. For brevity, details are not described herein again.

Therefore, the apparatus for selecting a relay UE according to this embodiment of the present invention triggers the relay UE reselection when determining that the current link quality of the first link and/or the current link quality of the second link of the current relay UE meet/meets the relay reselection trigger condition, so that communication between the first UE and the base station can be prevented from being affected because the current link quality of the first link and/or the current link quality of the second link of the current relay UE are/is relatively low. Therefore, overall system performance is improved, and user experience is enhanced.

It should be understood that the processor in the embodiments may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor or the processor may be any normal processor or the like.

The foregoing apparatus may further include a memory. The memory may include a read-only memory and a random access memory, and provide an instruction and data for the processor. A part of the memory may further include a non-volatile random access memory. For example, the memory may further store device type information.

In an implementation process, steps of the foregoing methods can be implemented by using a hardware integrated logical circuit in the processor, or by using instructions in a form of software. The steps of the methods disclosed with reference to the embodiments of the present invention may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information from the memory and completes the steps of the foregoing methods in combination with hardware in the processor. To avoid repetition, details are not described herein again.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for selecting a relay to communicate with a network, the method comprising:
    receiving, by a first user equipment (UE), information sent by a second UE, wherein the information indicates that the second UE is capable of serving as a UE to network relay UE; and
    determining, by the first UE, that the second UE is one of multiple candidate relay UEs according to the information sent by the second UE;
    wherein the second UE is capable of serving as the UE to network relay UE when a link quality of a radio link between the second UE and a base station is higher than a first quality threshold;
    wherein the first quality threshold is configured by the base station, or the first quality threshold is indicated by the first UE by using indication information; and
    wherein the information sent by the second UE is sent by the second UE to the first UE based on the link quality of the radio link between the base station and the second UE being higher than the first quality threshold.

2. The method according to claim 1, further comprising:
    performing, by the first UE, demodulation processing on the received information sent by the second UE, to determine whether the information sent by the second UE is successfully received.

3. The method according to claim 1, wherein the receiving, by the first UE, the information sent by the second UE comprises:
    receiving, by the first UE, the information periodically sent by the second UE; or
    sending, by the first UE, a specific message; and
    receiving, by the first UE, a response message sent by the second UE after receiving the specific message.

4. The method according to claim 1, further comprising:
    measuring, by the first UE, the information sent by the second UE, to obtain link quality of a radio link between the second UE and the first UE.

5. The method according to claim 1, further comprising:
    selecting, by the first UE, the second UE as a target relay UE, wherein link quality of a radio link between the second UE and the first UE is higher than a second quality threshold.

6. The method according to claim 4, wherein the measuring, by the first UE, the information sent by the second UE comprises:
    measuring, by the first UE, a demodulation reference signal (DMRS) comprised in the information sent by the second UE.

7. The method according to claim 1, further comprising:
    sending, by the first UE, first indication information to the base station, wherein the first indication information is used to indicate link quality of a radio link between the second UE and the first UE;
    receiving, by the first UE, second indication information sent by the base station, wherein the second indication information is used to indicate a target relay UE; and
    determining, by the first UE, the target relay UE based on the second indication information.

8. The method according to claim 1, further comprising:
    receiving, by the first UE, information sent by a current relay UE;
    measuring, by the first UE, the information sent by the current relay UE, to obtain link quality of a radio link between the first UE and the current relay UE; and
    based on the link quality being lower than a third quality threshold, triggering, by the first UE, reselecting a new relay UE.

9. The method according to claim 8, wherein the triggering, by the first UE, the reselecting the new relay UE comprises:
    sending, by the first UE, a relay reselection request to the base station; or
    unicasting or broadcasting, by the first UE, a specific message, so that another UE returns a response message to the first UE; or
    performing, by the first UE, selection of the new relay UE.

10. The method according to claim 1, further comprising:
    receiving, by the first UE, information sent by a current relay UE;
    measuring, by the first UE, the information sent by the current relay UE, to obtain a link quality of a radio link between the first UE and the current relay UE; and
    sending, by the first UE, the link quality to the base station.

11. The method of claim 10, further comprising:
    receiving, by the first UE, a relay reselection indication sent by the base station.

12. The method according to claim 1, wherein the link quality is at least one of: a reference signal received power (RSRP), a reference signal received quality (RSRQ), a received signal strength indicator (RSSI), or a channel quality indicator (CQI).

13. A first user equipment (UE), comprising:

a processor; and a memory storing instructions that when executed by the processor configure the first UE to perform steps comprising:

receiving information sent by a second UE, wherein the information indicates that the second UE is capable of serving as a UE to network relay UE; and determining that the second UE is one of multiple candidate relay UEs according to the information sent by the second UE;

wherein the second UE is capable of serving as the UE to network relay UE when a link quality of a radio link between the second UE and a base station is higher than a first quality threshold;

wherein the first quality threshold is configured by the base station, or the first quality threshold is indicated by the first UE by using indication information; and wherein the information sent by the second UE is sent by the second UE to the first UE based on the link quality of the radio link between the base station and the second UE being higher than the first quality threshold.

14. The first UE according to claim 13, wherein the memory stores further instructions that when executed by the processor further configures the first UE to perform steps comprising:

performing demodulation processing on the information sent by the second UE to determine whether the information sent by the second UE is successfully received.

15. The first UE according to claim 13, wherein the memory stores further instructions that when executed by the processor further configures the first UE to perform steps comprising:

receiving the information periodically sent by the second UE; or sending a specific message; and receiving a response message sent by the second UE after receiving the specific message.

16. The first UE according to claim 13, wherein the memory stores further instructions that when executed by the processor further configures the first UE to perform steps comprising:

sending first indication information to the base station, wherein the first indication information is used to indicate link quality of a radio link between the second UE and the first UE;

receiving second indication information from the base station, wherein the second indication information is used to indicate a target relay UE; and determining the target relay UE based on the second indication information.

* * * * *